United States Patent
Cramer et al.

(10) Patent No.: US 11,194,312 B2
(45) Date of Patent: *Dec. 7, 2021

(54) ORTHODONTIC APPLIANCES INCLUDING AT LEAST PARTIALLY UN-ERUPTED TEETH AND METHOD OF FORMING THEM

(71) Applicant: Align Technology, Inc., San Jose, CA (US)

(72) Inventors: Christopher Eric Cramer, Durham, NC (US); Jeeyoung Choi, Sunnyvale, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/837,864

(22) Filed: Apr. 1, 2020

(65) Prior Publication Data

US 2020/0225641 A1 Jul. 16, 2020

Related U.S. Application Data

(63) Continuation of application No. 15/942,341, filed on Mar. 30, 2018, now Pat. No. 10,613,515.

(Continued)

(51) Int. Cl.
*G05B 19/4099* (2006.01)
*B33Y 50/02* (2015.01)
(Continued)

(52) U.S. Cl.
CPC ........ *G05B 19/4099* (2013.01); *B29C 64/393* (2017.08); *B33Y 50/00* (2014.12);
(Continued)

(58) Field of Classification Search
CPC ..... H04W 12/02; H04W 76/11; H04W 88/02; B29C 64/393; B29L 2031/7536; B33Y 50/00; B33Y 50/02; G05B 19/4099; G05B 2219/33034; G05B 2219/35134; G05B 2219/45167; G05B 2219/49007; G06T 17/00; A61C 17/08; A61C 17/002; A61C 17/80
See application file for complete search history.

(56) References Cited

U.S. PATENT DOCUMENTS 5,820,368 A 10/1998 Wolk
5,975,893 A 11/1999 Chishti et al.
(Continued)

FOREIGN PATENT DOCUMENTS

WO 9858596 A1 12/1998

*Primary Examiner* — Kidest Bahta
(74) *Attorney, Agent, or Firm* — Shay Glenn LLP

(57) ABSTRACT

The example systems, methods, and/or computer-readable media described herein help with design of highly accurate models of un-erupted or partially erupted teeth and help fabricate of aligners for un-erupted or partially erupted teeth. Automated agents that use machine learning models to parametrically represent three-dimensional (3d) virtual representations of teeth as 3D descriptors in a 3D descriptor space are provided herein. In some implementations, the automated agents described herein provide instructions to fabricate aligners for at least partially un-erupted teeth using representative 3D descriptor(s) of a tooth type.

20 Claims, 18 Drawing Sheets

Related U.S. Application Data

(60) Provisional application No. 62/480,243, filed on Mar. 31, 2017.

(51) Int. Cl.
*B29C 64/393* (2017.01)
*B33Y 50/00* (2015.01)
*G06T 17/00* (2006.01)
*B29L 31/00* (2006.01)

(52) U.S. Cl.
CPC ....... *B33Y 50/02* (2014.12); *B29L 2031/7536* (2013.01); *G05B 2219/33034* (2013.01); *G05B 2219/35134* (2013.01); *G05B 2219/45167* (2013.01); *G05B 2219/49007* (2013.01); *G06T 17/00* (2013.01)

(56) References Cited

U.S. PATENT DOCUMENTS

| | | |
|---|---|---|
| 6,183,248 B1 | 2/2001 | Chishti et al. |
| 6,309,215 B1 | 10/2001 | Phan et al. |
| 6,386,864 B1 | 5/2002 | Kuo |
| 6,454,565 B2 | 9/2002 | Phan et al. |
| 6,471,511 B1 | 10/2002 | Chishti et al. |
| 6,524,101 B1 | 2/2003 | Phan et al. |
| 6,572,372 B1 | 6/2003 | Phan et al. |
| 6,607,382 B1 | 8/2003 | Kuo et al. |
| 6,705,863 B2 | 3/2004 | Phan et al. |
| 6,783,604 B2 | 8/2004 | Tricca |
| 6,790,035 B2 | 9/2004 | Tricca et al. |
| 6,814,574 B2 | 11/2004 | Abolfathi et al. |
| 6,830,450 B2 | 12/2004 | Knopp et al. |
| 6,947,038 B1 | 9/2005 | Anh et al. |
| 7,074,039 B2 | 7/2006 | Kopelman et al. |
| 7,104,792 B2 | 9/2006 | Taub et al. |
| 7,121,825 B2 | 10/2006 | Chishti et al. |
| 7,160,107 B2 | 1/2007 | Kopelman et al. |
| 7,192,273 B2 | 3/2007 | McSurdy, Jr. |
| 7,347,688 B2 | 3/2008 | Kopelman et al. |
| 7,354,270 B2 | 4/2008 | Abolfathi et al. |
| 7,448,514 B2 | 11/2008 | Wen |
| 7,481,121 B1 | 1/2009 | Cao |
| 7,543,511 B2 | 6/2009 | Kimura et al. |
| 7,553,157 B2 | 6/2009 | Abolfathi et al. |
| 7,600,999 B2 | 10/2009 | Knopp |
| 7,658,610 B2 | 2/2010 | Knopp |
| 7,766,658 B2 | 8/2010 | Tricca et al. |
| 7,771,195 B2 | 8/2010 | Knopp et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,914,283 B2 | 3/2011 | Kuo |
| 7,947,508 B2 | 5/2011 | Tricca et al. |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 2002/0192617 A1 | 12/2002 | Phan et al. |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2008/0118882 A1 | 5/2008 | Su |
| 2008/0160473 A1 | 7/2008 | Li et al. |
| 2008/0268400 A1 | 10/2008 | Moss et al. |
| 2008/0286716 A1 | 11/2008 | Sherwood |
| 2008/0286717 A1 | 11/2008 | Sherwood |
| 2009/0280450 A1 | 11/2009 | Kuo |
| 2010/0055635 A1 | 3/2010 | Kakavand |
| 2010/0129763 A1 | 5/2010 | Kuo |
| 2011/0269092 A1 | 11/2011 | Kuo et al. |
| 2013/0244194 A1* | 9/2013 | Bergersen ................ A61C 7/08 433/6 |
| 2014/0067334 A1 | 3/2014 | Kuo |
| 2015/0265376 A1 | 9/2015 | Avi |
| 2015/0366637 A1 | 12/2015 | Kopelman et al. |
| 2015/0366638 A1 | 12/2015 | Avi et al. |
| 2016/0135924 A1* | 5/2016 | Choi ...................... A61C 7/002 433/6 |
| 2016/0193014 A1 | 7/2016 | Morton et al. |
| 2016/0242870 A1 | 8/2016 | Matov et al. |
| 2016/0242871 A1 | 8/2016 | Morton et al. |
| 2017/0007359 A1 | 1/2017 | Avi et al. |
| 2017/0007360 A1 | 1/2017 | Kopelman et al. |
| 2017/0007361 A1 | 1/2017 | Allen et al. |
| 2017/0007365 A1 | 1/2017 | Kopelman et al. |
| 2017/0007366 A1 | 1/2017 | Kopelman et al. |
| 2017/0007386 A1 | 1/2017 | Mason et al. |
| 2017/0135792 A1 | 5/2017 | Webber |
| 2017/0135793 A1 | 5/2017 | Webber et al. |

(56) References Cited

U.S. PATENT DOCUMENTS

| | | |
|---|---|---|
| 2017/0165032 A1 | 6/2017 | Webber et al. |
| 2017/0319296 A1 | 11/2017 | Webber et al. |
| 2018/0153648 A1 | 6/2018 | Shanjani et al. |
| 2018/0153733 A1 | 6/2018 | Kuo |
| 2018/0168776 A1 | 6/2018 | Webber |
| 2018/0353264 A1 | 12/2018 | Riley et al. |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Bruce et al. |
| 2019/0021817 A1 | 1/2019 | Sato et al. |
| 2019/0029775 A1 | 1/2019 | John et al. |
| 2019/0046297 A1 | 2/2019 | Kopelman et al. |
| 2019/0069975 A1 | 3/2019 | Cam et al. |
| 2019/0099129 A1 | 4/2019 | Kopelman et al. |
| 2019/0125494 A1 | 5/2019 | Li et al. |
| 2019/0125497 A1 | 5/2019 | Mitra et al. |
| 2019/0152152 A1 | 5/2019 | O'Leary et al. |
| 2019/0175304 A1 | 6/2019 | Morton et al. |
| 2019/0231477 A1 | 8/2019 | Shanjani et al. |
| 2019/0262101 A1 | 8/2019 | Yaser et al. |
| 2019/0298494 A1 | 10/2019 | Webber et al. |
| 2019/0314119 A1 | 10/2019 | Kopelman et al. |
| 2019/0338067 A1 | 11/2019 | Robert et al. |
| 2019/0343606 A1 | 11/2019 | Wu et al. |
| 2020/0000553 A1 | 1/2020 | Svetlana et al. |
| 2020/0086553 A1 | 3/2020 | Mojdeh et al. |
| 2020/0100864 A1 | 4/2020 | Yuxiang et al. |
| 2020/0100865 A1 | 4/2020 | Yuxiang et al. |
| 2020/0100866 A1 | 4/2020 | Viktoria et al. |
| 2020/0100871 A1 | 4/2020 | Yuxiang et al. |
| 2020/0155276 A1 | 5/2020 | Bruce et al. |
| 2020/0188062 A1 | 6/2020 | Avi et al. |
| 2020/0214598 A1 | 7/2020 | Huizhong et al. |
| 2020/0214801 A1 | 7/2020 | Yuxiang et al. |
| 2020/0390523 A1 | 12/2020 | Jun et al. |
| 2021/0078357 A1 | 3/2021 | Venkatasanthanam et al. |

* cited by examiner

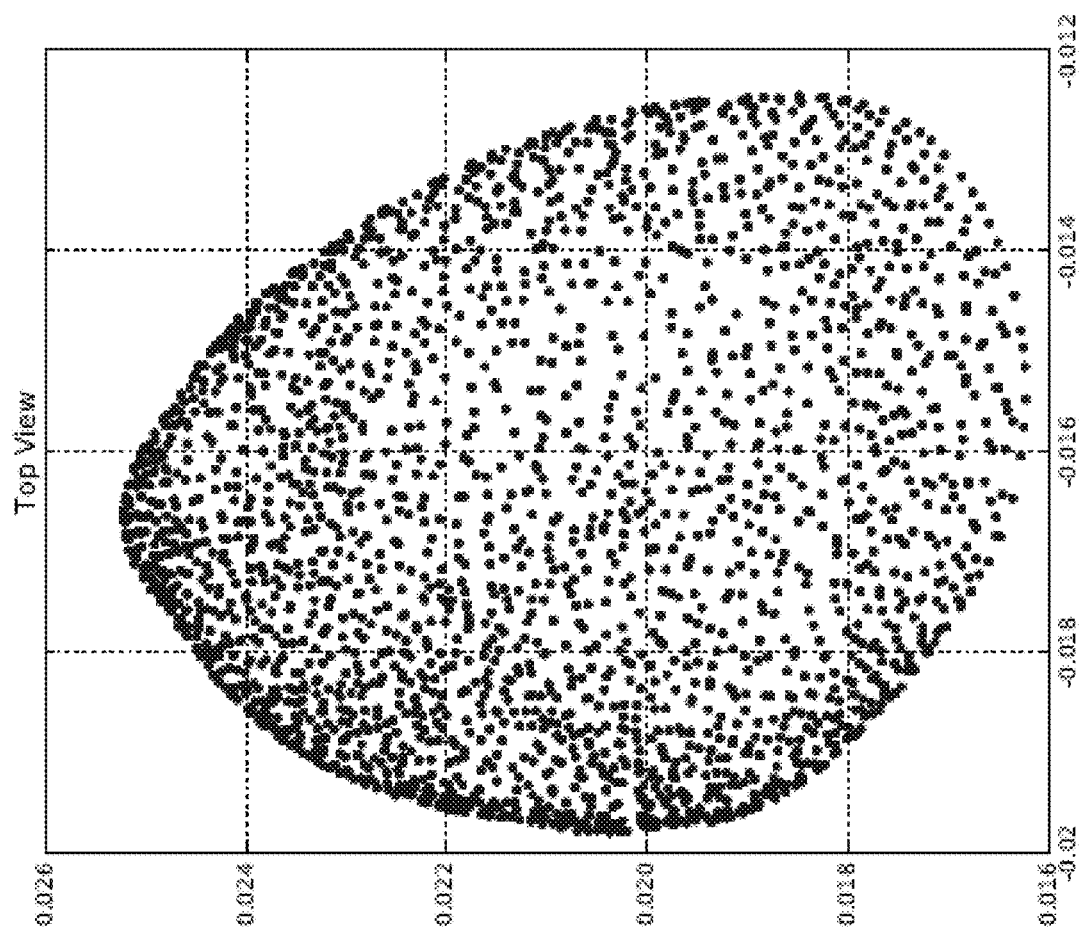

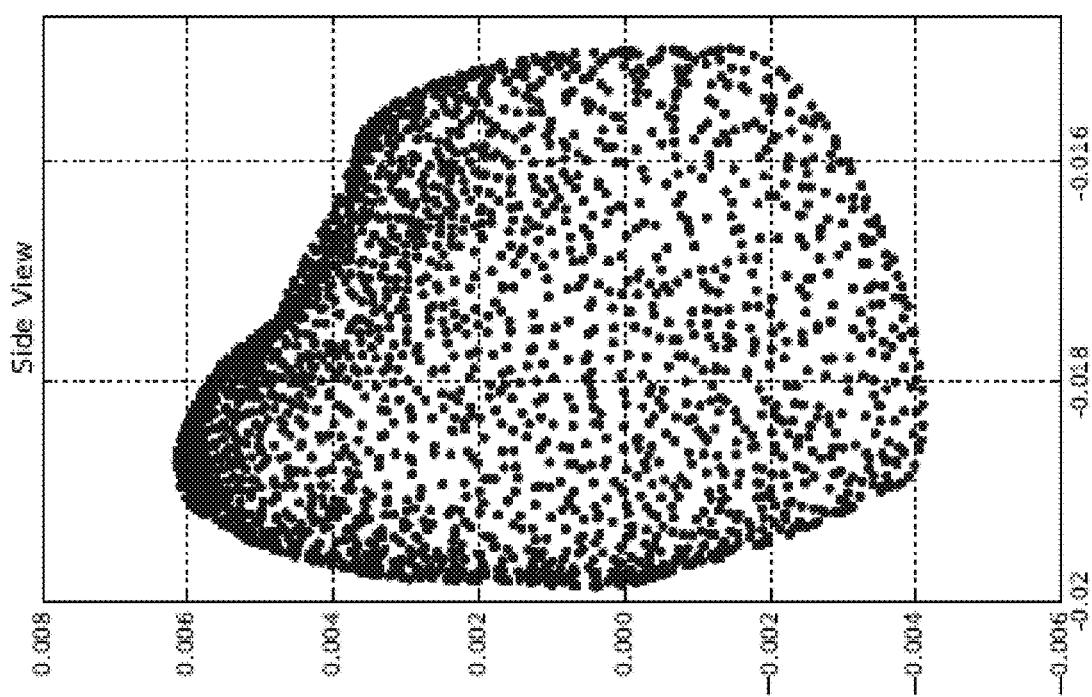

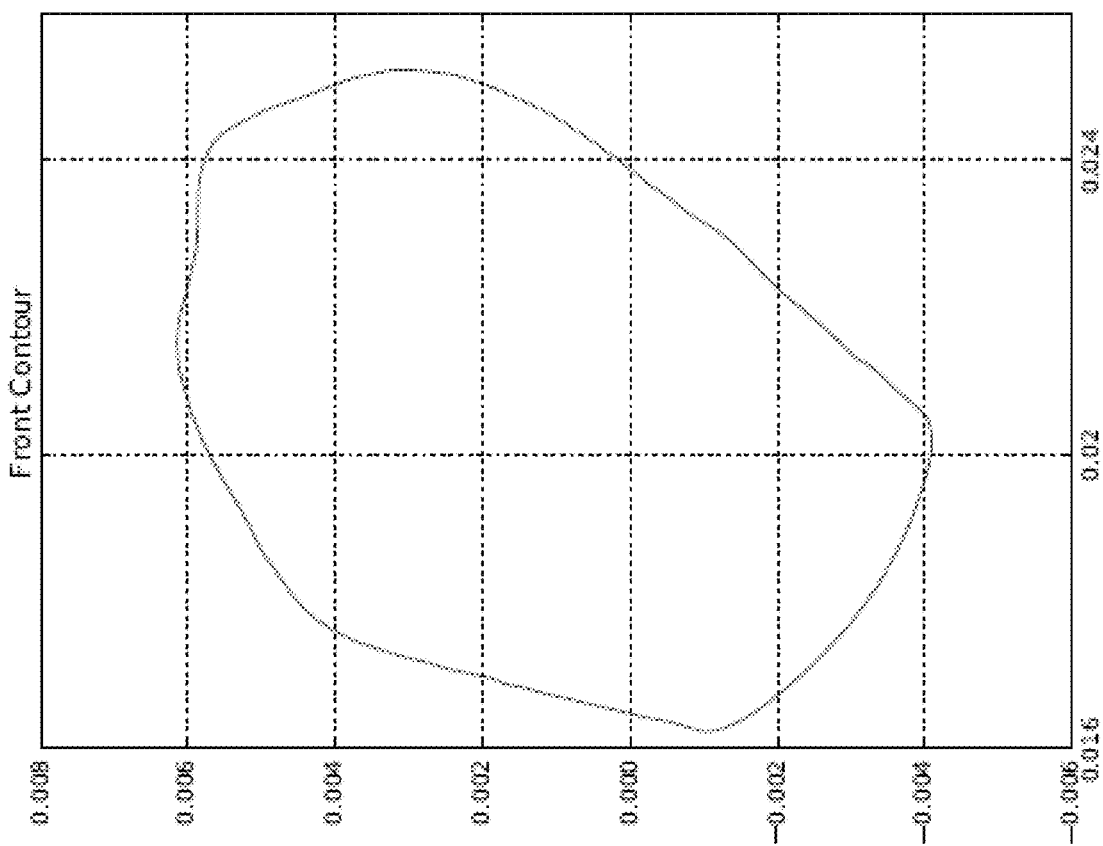

ORTHODONTIC APPLIANCES INCLUDING AT LEAST PARTIALLY UN-ERUPTED TEETH AND METHOD OF FORMING THEM

CROSS REFERENCE TO RELATED APPLICATIONS

The present application is a continuation of U.S. patent application Ser. No. 15/942,341, entitled "ORTHODONTIC APPLIANCES INCLUDING AT LEAST PARTIALLY UN-ERUPTED TEETH AND METHOD OF FORMING THEM," filed Mar. 30, 2018, which claims priority to U.S. Provisional Patent Application No. 62/480,243, entitled "VIRTUAL GEOMETRY IN DENTAL ALIGNERS BY MEANS OF CREATING MATHEMATICAL REPRESENTATIONS OF TOOTH SHAPES," filed Mar. 31, 2017, each of which is herein incorporated by reference in its entirety.

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

In many pediatric cases, orthodontic aligners may be used before all of the patient's permanent teeth have completely erupted. For instance, an orthodontic treatment plan may call for use of removable orthodontic aligners on a pediatric patient even though the patient has un-erupted or partially erupted teeth. In such cases, the orthodontic aligner may need to be designed to accommodate the un-erupted or partially erupted teeth. While conventional techniques make it possible to predict the size of an un-erupted or partially erupted tooth with a high degree of accuracy, conventional techniques are presently unable to predict the shape of such a tooth. In the absence of such a prediction, orthodontic aligners currently create a space buffer or cavity in the shape of a generic tooth (e.g., a tooth shape that was observed to fit over a sample size of observed teeth) that can be positioned above the point at which the permanent tooth will erupt.

While convenient in some instances, conventional techniques may present numerous challenges. For instance, a conventional space buffer or cavity having a generic tooth shape may not look "natural" in the context of an un-erupted or partially erupted tooth it is positioned over. As another example, a conventional space buffer or cavity having a generic tooth shape may come into contact with an un-erupted or partially erupted tooth, and as a result, may interrupt tooth eruption and/or cause discomfort. For these and other reasons, the systems, methods, and/or computer-readable media discussed herein are provided.

SUMMARY OF THE DISCLOSURE

The 3D descriptors may provide parametric descriptions of virtual contours of the 3D virtual representations identified thereon. As noted herein, automated agents may identify descriptor distances in the 3D descriptor space between 3D descriptors in order to identify representative 3D descriptor(s) of a tooth type.

An anatomical identifier of a tooth type of an at least partially un-erupted tooth of a patient (e.g., a pediatric patient) may be gathered. The anatomical identifier may comprise a universal tooth number, a character string associated with the tooth type, or an automated identification of the tooth type through, e.g., an image. Automated agents may identify the tooth type using the anatomical identifier. Automated agents may gather one or more representative 3D descriptors for the tooth type. The representative 3D descriptor may be selected from a plurality of 3D descriptors for the tooth type. The plurality of 3D descriptors may include the representative 3D descriptor and may parametrically represent a plurality of virtual surface contours of the tooth type according to a plurality of spatial parameters. In general, the 3D descriptors may be referred to as mathematical 3D descriptors, an may include a numeric description, a geometric description, and mathematical and/or geometric relationship description, or the like. Similarly, the 3D descriptor space may be referred to as mathematical 3D descriptor space.

In some implementations, the representative 3D descriptor has a minimum "distance" (e.g., in the 3D descriptor space) to other 3D descriptors of the plurality of 3D descriptors. Each of the plurality of 3D descriptors may be associated with one of the plurality of 3D virtual representations of a plurality of teeth gathered from a plurality of subjects. As noted herein, such 3D virtual representations may be gathered from, e.g., scans, images, models, etc. of teeth of the tooth type from subjects whose teeth have been imaged. The automated agents described herein may form a virtual 3D tooth shape for the at least partially un-erupted tooth using the representative 3D descriptor. As noted herein, instructions to form at least a portion of a removable orthodontic appliance for the at least partially un-erupted tooth using the 3D tooth shape for the at least partially un-erupted tooth may be provided.

In some implementations, the plurality of 3D virtual representations of teeth each comprise a plurality of orthoscopic views of the corresponding plurality of teeth. The plurality of 3D descriptors may comprise a convex bounding 3D shape. The plurality of 3D descriptors may be represented using an Elliptic Fourier Descriptor (EFD) of the plurality of virtual surface contours. The plurality of spatial parameters may comprise one or more locational components.

In some implementations, the plurality of 3D descriptors comprises a plurality of spheres. The plurality of spheres may comprise a plurality of voxelized spheres, a plurality of spheres that are not voxelized, or some combination thereof. In various implementations, the plurality of spatial parameters comprise a plurality of polar coordinates to virtually represent a plurality of voxelized spheres.

The removable orthodontic appliances may comprise a polymeric appliance such as a polymeric orthodontic appliance and/or a polymeric appliance designed to incrementally change tooth positions. In some implementations, providing instructions to form at least the portion of the removable orthodontic appliance comprises providing instructions to three-dimensionally print the at least the portion of the removable orthodontic appliance.

The representative 3D descriptor may comprise an average 3D descriptor of the plurality of 3D descriptors.

In some implementations, systems, methods, and/or computer-readable media may include: gathering a second anatomical tooth identifier of the tooth type, the second anatomical tooth identifier forming a basis to identify the tooth type; gathering, using the second anatomical tooth identifier, the plurality of 3D virtual representations of a plurality of teeth from a plurality of subjects, identifying the plurality of virtual surface contours for the tooth type; identifying the plurality of 3D descriptors to parametrically represent the plurality of virtual surface contours according to the plurality of spatial parameters; identifying a descriptor location in the 3D descriptor space of each of the plurality of 3D descriptors; assigning a descriptor distance to each of the plurality of 3D descriptors, the descriptor distance representing a difference between the descriptor location of the each 3D descriptor and the descriptor location of a rest of the plurality of 3D descriptors; and identifying the representative 3D descriptor for the tooth type by finding a minimum descriptor distance between two or more of the plurality of 3D descriptors.

In some implementations, assigning the descriptor distance comprises: identifying a variance between the each of the plurality of 3D descriptors and the rest of the plurality of 3D descriptors; and minimizing the variance. In various implementations, rotational orientations or sizes of the plurality of 3D descriptors are normalized before identifying the representative 3D descriptor for the tooth type. In some implementations, identifying the plurality of 3D descriptors comprises creating at least one spherical harmonic based signature based on a sum of spherical harmonics for the plurality of 3D descriptors. In various implementations, the at least one spherical harmonic based signature comprises a plurality of spherical harmonic based signatures; and finding the minimum descriptor distance comprises identifying a minimum distance between two or more of the plurality of spherical harmonic based signatures in the 3D descriptor space. Additionally, identifying the minimum distance may comprise performing a least squares analysis of a Euclidean distance between the two or more of the plurality of spherical harmonic based signatures.

Additionally, as noted herein, there may be needs to address technical problems related to providing a space buffer that looks "average" for a particular tooth type, to produce more normal and natural looking virtual geometry that is more universally accommodating to the erupting tooth despite uniqueness of each patient's dentition.

The present application relates to an orthodontic device designed to accommodate an at least partially un-erupted tooth. The device can include a cavity positioned over the erupting site before or during eruption and configured to accommodate an erupting tooth without interfering with or contacting the erupting tooth.

In another aspect, the cavity can be designed to represent or approximate a representative tooth shape, with size to be determined on a per-patient basis, for each of the teeth in the Universal Numbering System. The representative tooth shape may be intended to accommodate erupting teeth without interfering with eruption, while representing a most probable tooth shape and being more aesthetically pleasing to the patient.

In another aspect, the cavity can be designed based on evaluating data representing a plurality of teeth for each of the teeth in the Universal Numbering System. techniques can be applied to the data to calculate the representative tooth shape for each tooth of a patient. The technique can use 2D Elliptic Fourier Descriptors (EFDs) to determine the representative tooth shape. In another embodiment, the technique can use spherical harmonics to determine the representative tooth shape.

Once the representative tooth shape has been computed, the orthodontic device can be manufactured incorporating one or more cavities into the device in the shape of the representative tooth for that specific un-erupted or erupting tooth.

In some embodiments, a method for accommodating an at least partially un-erupted during a proposed orthodontic treatment is provided, comprising identifying, via a computing device, whether a patient's arch contains an at least partially un-erupted tooth, receiving, via the computing device, data representing a plurality of teeth corresponding to an anatomical identifier (e.g., a universal tooth number) of the at least partially un-erupted tooth, evaluating the data representing the plurality of teeth with a technique to determine a representative 3D shape for the at least partially un-erupted teeth after they have fully erupted, determining a scaling factor, via the computing device, for a cavity of a dental appliance positioned to accommodate the at least partially un-erupted tooth as the tooth erupts, and creating the dental appliance configured to reposition at least one tooth of the patient, the dental appliance including the cavity having the representative 3D shape and being sized according to the scaling factor for the un-erupted or erupting tooth.

In some embodiments, the modeling technique comprises generating two-dimensional top, front, and side views from the data representing the plurality of teeth.

In another embodiment, the modeling technique further comprises generating a characteristic, convex bounding shape for each two-dimensional top, front, and side view. In some embodiments, the modeling technique further comprises representing the convex bounding shape for each two-dimensional top, front, and side view using elliptic Fourier descriptors.

In some embodiments, the modeling technique further comprises normalizing the elliptic Fourier descriptors to provide rotation and size invariance.

In one embodiment, the modeling technique further comprises computing a principal component analysis to find the optimal 3D shape for the cavity from the data representing the plurality of teeth.

In yet another embodiment, the modeling technique comprises scaling a length of the longest axis of each of the teeth from the data representing the plurality of teeth. The modeling technique can further comprise forming a voxelized sphere for each of the teeth from the data representing the plurality of teeth to an array having uniform size.

In some embodiments, the modeling technique further comprises summing spherical harmonics for each point of the voxelized sphere over a specific frequency range to compute a spherical harmonic signature for each tooth.

In other embodiments, the modeling technique further comprises computing a Euclidean distance between each tooth's spherical harmonic signature to find the optimal 3D shape for the cavity from the data representing the plurality of teeth.

A dental appliance having a cavity for accommodating an un-erupted or erupting tooth is also provided, comprising an appliance designed to implement at least a portion of a treatment plan, comprising a shell having a plurality of cavities therein designed to receive teeth of a jaw with at least one of the plurality of cavities being a cavity for accommodating an at least partially un-erupted tooth therein, wherein at least one of a size, shape, location, and orientation of at least one of the cavities for accommodating an at least partially un-erupted tooth is designed based upon a evaluation of a sample of teeth that calculates an optimal 3D shape for the at least partially un-erupted tooth.

In some embodiments, the evaluation comprises generating two-dimensional top, front, and side views from the data representing the plurality of teeth, generating a characteristic, convex bounding shape for each two-dimensional top, front, and side views, representing the convex bounding shape for each two-dimensional top, front, and side view using elliptic Fourier descriptors, normalizing the elliptic Fourier descriptors to provide rotation and size invariance, and computing a principal component analysis to find the optimal 3D shape for the cavity from the data representing the plurality of teeth.

In another embodiment, the modeling technique comprises scaling a length of the longest axis of each of the teeth from the data representing the plurality of teeth, forming a voxelized sphere for each of the teeth from the data representing the plurality of teeth to an array having uniform size, summing spherical harmonics for each point of the voxelized sphere over a specific frequency range to compute a spherical harmonic signature for each tooth, and computing a Euclidean distance between each tooth's spherical harmonic signature to find the optimal 3D shape for the cavity from the data representing the plurality of teeth.

A non-transitory computing device readable medium is provided that has instructions stored thereon that are executable by a processor to cause a computing device to receive, via a computing device, data representing a plurality of teeth, identify data indicating which of the plurality of teeth are at least partially un-erupted, determine an optimal 3D shape for each of the un-erupted or erupting teeth after they have fully erupted using a modeling technique, and generate a series of incremental tooth arrangements incorporating the optimal 3D shape into a cavity positioned over each of the un-erupted or erupting teeth to define a proposed orthodontic treatment.

In some embodiments, the modeling technique comprises generating two-dimensional top, front, and side views from the data representing the plurality of teeth.

In other embodiments, the modeling technique further comprises generating a characteristic, convex bounding shape for each two-dimensional top, front, and side view.

In another embodiment, the modeling technique further comprises representing the convex bounding shape for each two-dimensional top, front, and side view using elliptic Fourier descriptors. In some embodiments, the modeling technique further comprises normalizing the elliptic Fourier descriptors to provide rotation and size invariance. In other embodiments, the modeling technique further comprises computing a principal component analysis to find the optimal 3D shape for the cavity from the data representing the plurality of teeth.

In one embodiment, the modeling technique comprises scaling a length of the longest axis of each of the teeth from the data representing the plurality of teeth.

In another embodiment, the modeling technique further comprises forming a voxelized sphere for each of the teeth from the data representing the plurality of teeth to an array having uniform size.

In some embodiments, the modeling technique further comprises summing spherical harmonics for each point of the voxelized sphere over a specific frequency range to compute a spherical harmonic signature for each tooth.

In another embodiment, the modeling technique further comprises computing a Euclidean distance between each tooth's spherical harmonic signature to find the optimal 3D shape for the cavity from the data representing the plurality of teeth.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIGS. 2A, 2B, and 2C are diagrams showing top, front, and side views of samples of an upper, right canine tooth shape.

FIGS. 2D, 2E, and 2F are diagrams showing examples of convex bounding shapes corresponding to the top, front, and side views of FIGS. 2A, 2B, and 2C.

DETAILED DESCRIPTION

The present disclosure is related to systems, methods, computing device readable media, and devices that solve technical problems related to design of highly accurate models of un-erupted or partially erupted teeth ("at least partially un-erupted teeth") and/or technical problems related to fabrication of aligners for at least partially un-erupted teeth. Automated agents that use machine learning models to parametrically represent three-dimensional (3D) virtual representations of teeth as 3D descriptors (e.g., mathematical 3D descriptors) in a 3D descriptor space (e.g., mathematical 3D descriptor space) are provided herein. The 3D descriptors may provide parametric descriptions of virtual contours of the 3D virtual representations identified thereon. In some implementations, the automated agents described herein provide instructions to fabricate aligners for at least partially un-erupted teeth using representative 3D descriptor(s) of a tooth type.

Example Structures and Systems

Figure 1A:
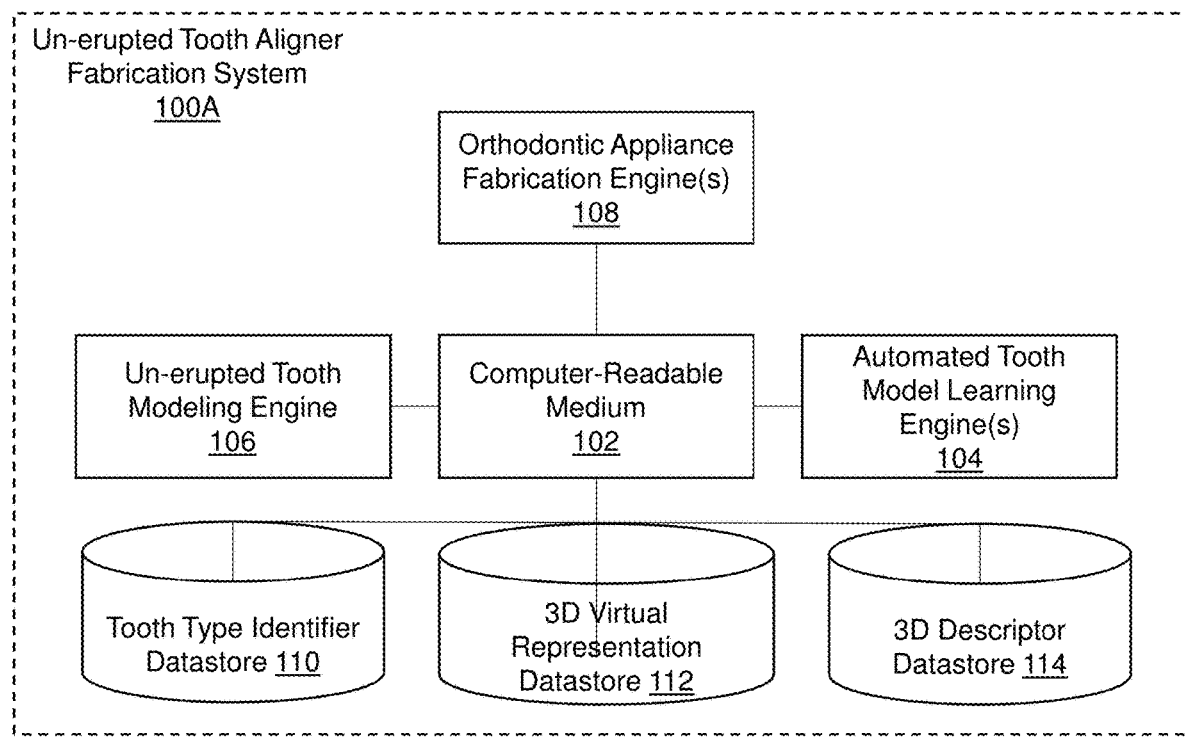
FIG. 1A is a diagram showing an example of an un-erupted tooth aligner fabrication system.

FIG. 1A is a diagram showing an example of an un-erupted tooth aligner fabrication system 100A. The parts (e.g., modules, components, circuits, etc.) of the un-erupted tooth aligner fabrication system 100A may include one or more engines and datastores. A computer system can be implemented as an engine, as part of an engine or through multiple engines. As used herein, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

The un-erupted tooth aligner fabrication system 100A may include a computer-readable medium 102, 20 automated tooth model learning engine(s) 104, un-erupted tooth modeling engine(s) 106, orthodontic appliance (e.g., including, but not limited to aligners) fabrication engine(s) 108, a tooth type identifier datastore 110, a 3D virtual representation datastore 112, and a 3D descriptor datastore 114. One or more of the modules of the un-erupted tooth aligner fabrication system 100A may be coupled to one another (e.g., through the example couplings shown in FIG. 1A) or to modules not explicitly shown in FIG. 1A. The computer-readable medium 102 may include any computer-readable medium, including without limitation a bus, a wired network, a wireless network, or some combination thereof.

The automated tooth modeling learning engine(s) 104 may implement one or more automated agents configured to learn tooth models for various tooth types based on 3D virtual representations of teeth taken from subjects. A "tooth type," as used herein, may refer to a specific tooth in the mouth of a human being. A tooth type may include any specific tooth identified according to an "anatomical tooth identifier," which as used herein, may refer to any identifier used to anatomically identify the tooth type. Examples of anatomical tooth identifiers include identifiers of a universal or other tooth numbering system, character identifiers, image(s), etc. A "3D virtual representation," as used herein, may refer to a 3D rendering of a tooth. Examples of 3D virtual representations include animated 3D renderings, composite 3D renderings assembled from 2D images, etc. A 3D virtual representation may have one or more "virtual surface contours," or contours that define surfaces of the tooth in a virtual 3D space.

In various implementations, the automated tooth modeling engine(s) 104 implement one or more automated agents configured to describe 3D virtual representations of teeth with 3D descriptors that use spatial parameters. A "mathematical 3D descriptor," as used herein, may refer to a function that represents virtual surface contours and/or other portions of 3D virtual representations of teeth according to spatial parameters. Examples of 3D descriptors include Elliptical Fourier Descriptors (EFDs), spherical harmonic functions that use voxelized spheres, and spherical harmonic functions that use non-voxelized spheres. A "spatial parameter," as used herein, may refer to a parameter that relates to a spatial element. Examples of spatial parameters include locational coordinates identified along orthogonal systems, such as three translational planes, 3D polar coordinates, etc. As noted herein, 3D descriptors may "parametrically represent" a 3D virtual representation, or represent that 3D virtual representation according to one or more parameters, such as spatial parameters.

In various implementations, 3D descriptors may form a "mathematical 3D descriptor space," or a datastore of 3D descriptors with descriptor locations assigned for each 3D descriptor space. "Descriptor locations," as used herein, may refer to unique coordinates in the 3D descriptor space where each 3D descriptor reside. In various implementations, descriptor locations may be used to define "descriptor distances," or differences in distances between descriptor locations of 3D descriptors in a 3D descriptor space.

In some implementations, the automated tooth modeling engine(s) 104 identify a representative 3D descriptor for a given tooth type. A "representative 3D descriptor," as used herein, may refer to a 3D descriptor for a tooth type that is most similar to other 3D descriptors for that tooth type. In some implementations, the representative 3D descriptor may reside a minimum distance from other 3D descriptors for a tooth type. A "minimum distance," as used in this context, may refer to the minimum descriptor distance between a single 3D descriptor for a tooth type and all other 3D descriptors for that tooth type in the 3D descriptor space. The minimum distance may be determined using the techniques described herein.

In various implementations, the automated tooth modeling engine(s) 104 implement one or more automated agents configured to gather tooth type identifiers for various tooth types from the tooth type identifier datastore 110, gather 3D virtual representations of those tooth types from the 3D virtual representation datastore 112, and identify representative 3D descriptors for various tooth types. The automated agents may further be configured to store the representative 3D descriptors for various tooth types in the 3D descriptor datastore 114.

The un-erupted tooth modeling engine(s) 106 may implement one or more automated agents configured to create virtual tooth models of different tooth types. In some implementations, the un-erupted tooth modeling engine(s) 106 may be configured to gather a tooth type of an at least partially un-erupted tooth from the tooth type identifier datastore 110. The un-erupted tooth modeling engine(s) 106 may further be configured to gather a representative 3D descriptor for the tooth type (using e.g., an anatomical tooth identifier) from the 3D descriptor datastore 114. The un-erupted tooth modeling engine(s) 106 may be configured to provide instructions to the orthodontic appliance fabrication engine(s) 108 to fabricate at least a portion of an aligner for the least partially un-erupted tooth. The instructions may include a virtual 3D shape formed in accordance with the representative 3D descriptor.

The orthodontic appliance fabrication engine(s) 108 may implement one or more automated agents configured to fabricate an aligner. Examples of an aligner are described in detail in U.S. Pat. No. 5,975,893, and in published PCT application WO 98/58596, which is herein incorporated by reference for all purposes. Systems of dental appliances employing technology described in U.S. Pat. No. 5,975,893 are commercially available from Align Technology, Inc., Santa Clara, Calif., under the tradename, Invisalign System. Throughout the description herein, the use of the terms "orthodontic aligner", "aligner", or "dental aligner" is synonymous with the use of the terms "appliance" and "dental appliance" in terms of dental applications. For purposes of clarity, embodiments are hereinafter described within the context of the use and application of appliances, and more specifically "dental appliances." The orthodontic appliance fabrication engine(s) 108 may be part of 3D printing systems, thermoforming systems, or some combination thereof.

The tooth type identifier datastore 110 may be configured to store one or more tooth type identifiers of different tooth types. In some implementations, the tooth type identifiers correspond to numbers of a Universal Tooth Numbering System, character strings to identify tooth types by anatomy, images or portions thereof to identify tooth types by geometry and/or other characteristics, etc.

The 3D virtual representation datastore 112 may be configured to store 3D virtual representations of different tooth types. As will be noted herein, the 3D virtual representations may comprise 3D models of teeth, indexed by tooth type, taken from a variety of subjects. Examples of such subjects include past orthodontic patients, models, cadavers, etc.

The 3D descriptor datastore 114 may be configured to store 3D descriptors. As noted further herein, in some implementations, the 3D descriptors may be indexed by tooth type and/or by tooth type identifier. The 3D descriptors may form a 3D descriptor space having descriptor locations and/or the properties of such a space, as noted herein.

Figure 1B:
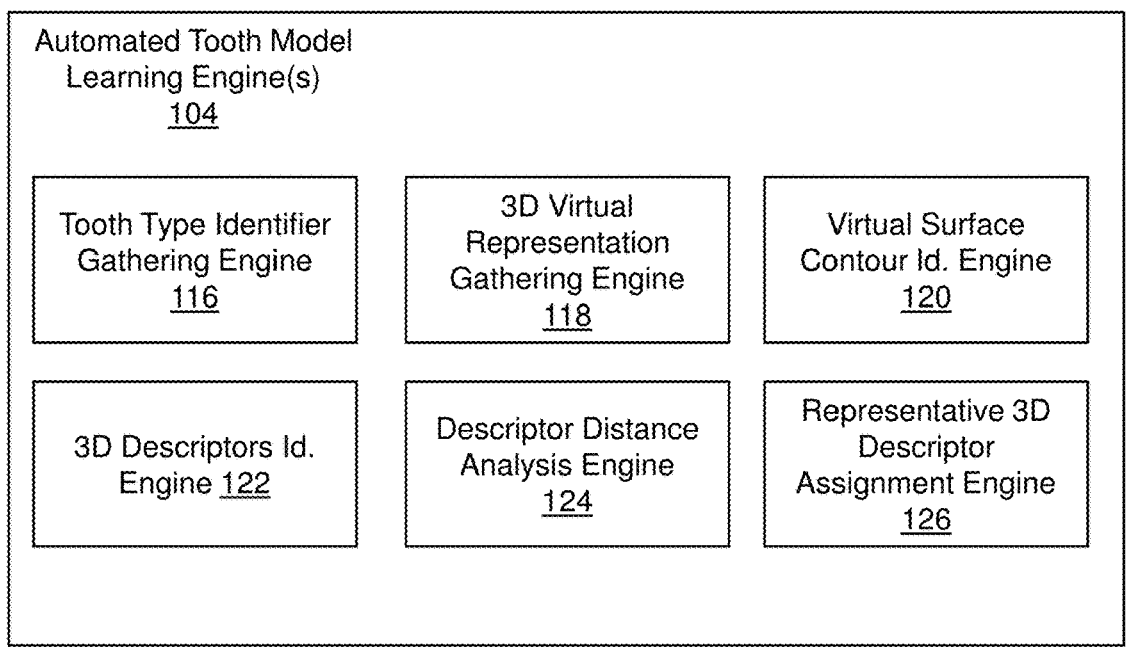
FIG. 1B is a diagram showing an example of automated tooth model learning engine(s).

FIG. 1B is a diagram showing an example of the automated tooth model learning engine(s) 104. The automated tooth model learning engine(s) 104 may include a tooth type identifier gathering engine 116, a 3D virtual representation gathering engine 118, a virtual surface contour identification engine 120, a 3D descriptor identification engine 122, a descriptor distance analysis engine 124, and a representative 3D descriptor assignment engine 126. One or more of the modules of the automated tooth model learning engine(s) 104 may be coupled to one another (e.g., through the example couplings shown in FIG. 1B) or to modules not explicitly shown in FIG. 1B.

The tooth type identifier gathering engine 116 may implement one or more automated agents configured to gather tooth type identifiers from the tooth type identifier datastore 110. In some implementations, the tooth type identifier gathering engine 116 gathers a series of tooth type identifiers corresponding to the teeth in a human being's permanent/adult dentition. The tooth type identifier gathering engine 116 may gather from the tooth type identifier datastore 110 universal or other tooth numbering system, character identifiers, image(s), etc. corresponding to a person's adult teeth. In various implementations, the tooth type identifier gathering engine 116 provides tooth types to other modules, such as the 3D virtual representation gathering engine 118.

The 3D virtual representation gathering engine 118 may implement one or more automated agents configured to gather 3D virtual representations of tooth types from the 3D virtual representation datastore 112. The 3D virtual representation gathering engine 118 may implement one or more automated database queries to the 3D virtual representation datastore 112. The database queries may request 3D virtual representations based on tooth type identifiers and may receive 3D virtual representations and/or identifiers of 3D virtual representations in response to these queries. In some implementations, the 3D virtual representation gathering engine 118 may decompose 3D virtual representations into, e.g., orthoscopic views along orthogonal directions.

The virtual surface contour identification engine 120 may implement one or more automated agents configured to identify virtual surface contours of 3D virtual representations of tooth types. The virtual surface contour identification engine 120 may use one or more optical feature recognition techniques to identify object boundaries, virtual curves, and/or other aspects of virtual surfaces. The virtual surface contour identification engine 120 may provide virtual surface contour identifiers in a relevant format, such as a set of points and/or a point cloud defining a contour, a function describing a contour, etc. The virtual surface contour identification engine 120 may provide information about virtual contours to one or more other modules of the automated tooth model learning engine(s) 104, such as the 3D descriptors identification engine 122.

The 3D descriptors identification engine 122 may implement one or more automated agents configured to identify 3D descriptors to represent virtual surface contours. In some implementations, the 3D descriptors identification engine 122 represents virtual surface contours using 3D descriptors comprising EFDs. An example of this technique will now be discussed with reference to FIGS. 2A, 2B, 2C, 3, and 4. In various implementations, the 3D descriptors identification engine 122 may be configured to evaluate two-dimensional (2D) orthoscopic views of sample teeth (e.g., those sharing a tooth type) from a plurality of subjects.

Figure 2B:
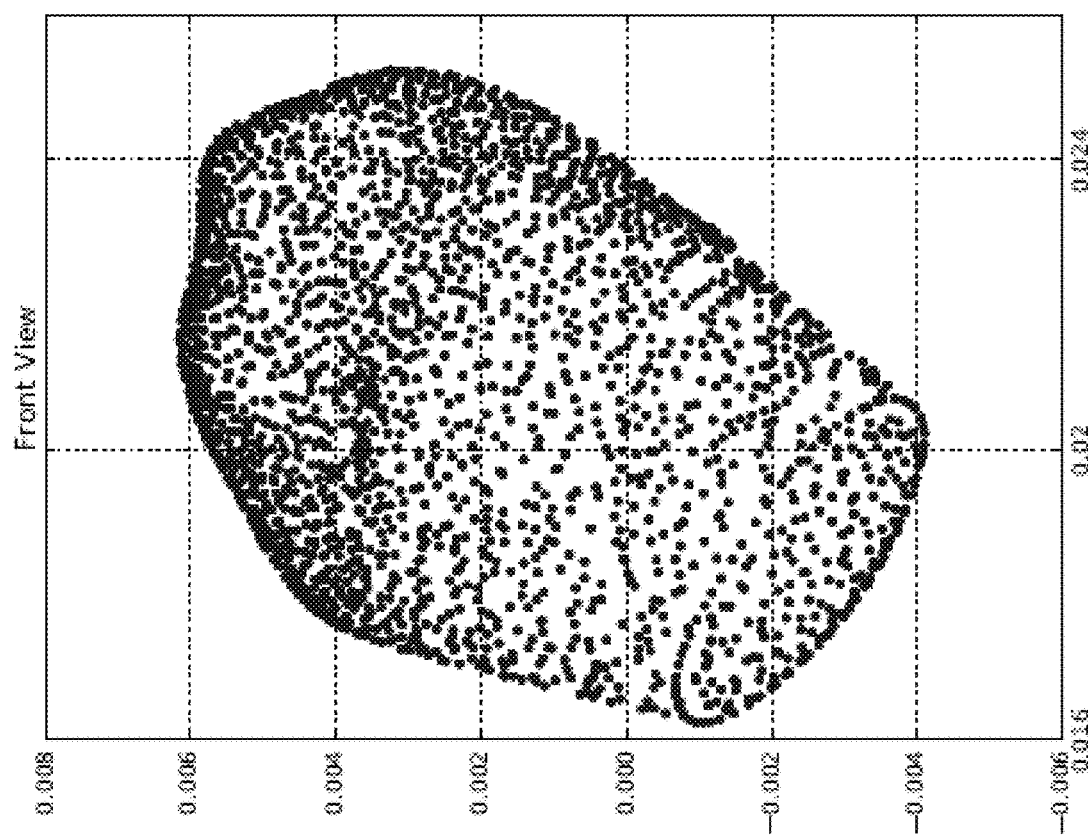

FIGS. 2A, 2B, and 2C show example top, front, and side views of samples of an upper-right canine tooth (tooth 6 in the Universal Numbering System). To generate each 2D view, the 3D descriptors identification engine 122 may have flattened the vertices of the tooth meshes for each of the samples by removing one dimension, so the top view was represented by the X and Y coordinates of the vertices, the front view by the X and Z coordinates, and the side view by the Y and Z coordinates. For each of the orthoscopic views, the mesh is then collapsed into a point cloud. A shape is then drawn around the bounds of each point cloud.

In some implementations, the 3D descriptors identification engine 122 may use a concave bounding shape to model features of each view. The 3D descriptors identification engine 122 may use Algorithm 1 (below) to generate the characteristic, convex bounding shape for each 2D tooth view.

| Algorithm 1 Algorithm to generate concave boundary around a set of points, $\mathcal{P}$ |  |
|---|---|
| 1: | Generate the Dulaunay triangularization $\Delta$ of all points $\mathcal{P}$ |
| 2: | Identify the boundary as all edges of the triangularization that are only seen once (i.e., those on the outer boundary) |
| 3: | Create the list B containing all boundary edges and their lengths |
| 4: | Sort B by descending order of length |
| 5: | Create result set $r \leftarrow \{\}$ |
| 6: | while B is not empty do |
| 7: | $\quad e \leftarrow \text{pop}(B)$ |
| 8: | $\quad$ if $|e| > \lambda_p$ then |
| 9: | $\quad\quad$ find the vertex, v of the triangle opposite to the edge, e |
| 10: | $\quad\quad$ remove edge e from the triangularization $\Delta$ |
| 11: | $\quad\quad$ add the two newly revealed edges $(e_0, v)$ and $(e_1, v)$ to B ordered by their lengths |
| 12: | $\quad$ else |
| 13: | $\quad\quad r \leftarrow r \cup \{e\}$ |
| 14: | $\quad$ end if |
| 15: | end while |
| 16: | Generate a counter-clockwise polygon of the characteristic bounding shape, based on the edges in r |

Figure 2D:
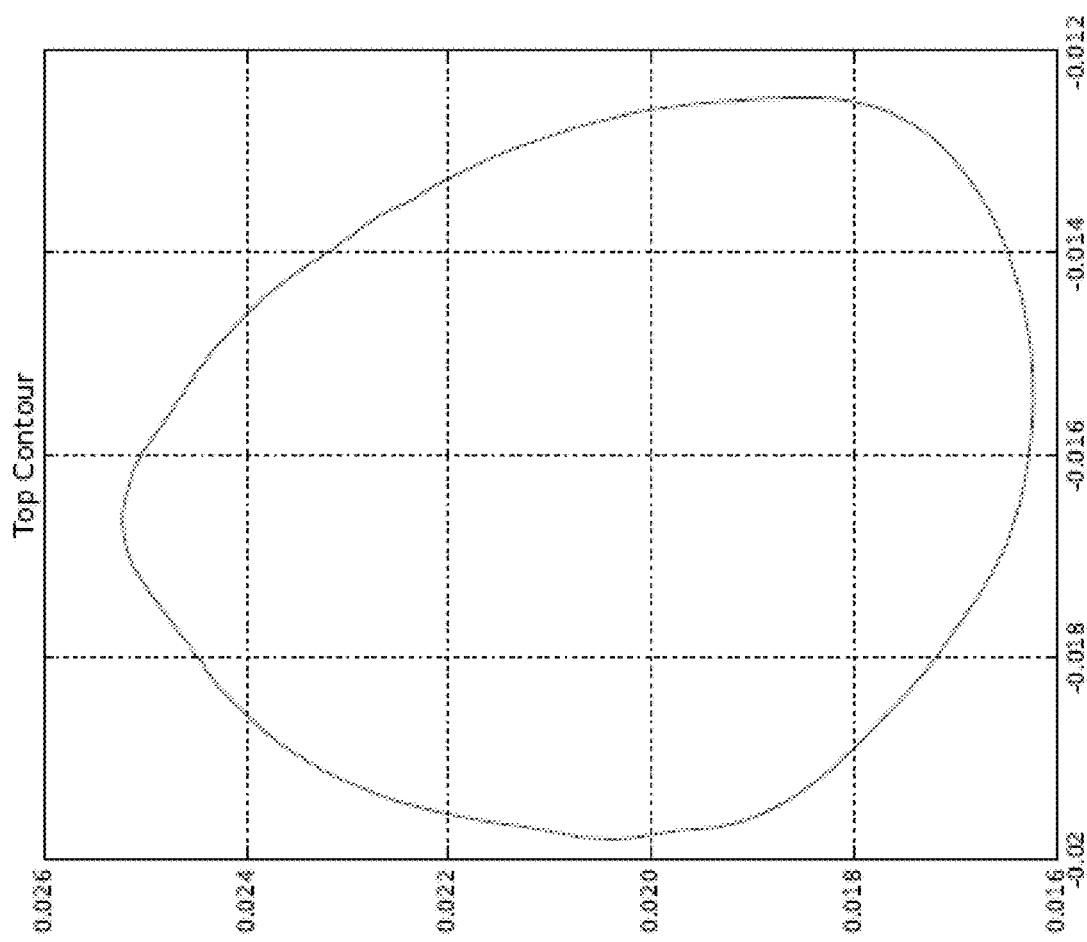
Figure 2F:
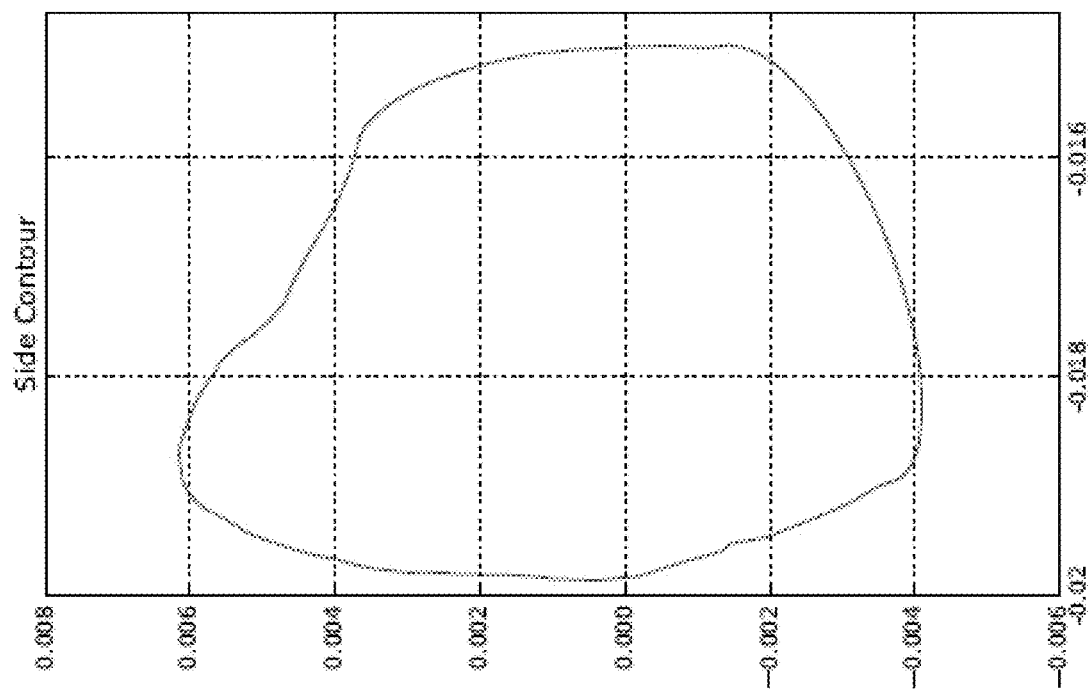

In this example, for purposes of determining the concave bounding shape, the 3D descriptors identification engine 122 may set a length threshold (in this example, $\lambda_p=0:0005$) to represent maximum line length for the size of the tooth representations. FIGS. 2D, 2E, and 2F show examples of convex bounding shapes corresponding to the top, front, and side views of FIGS. 2A, 2B, and 2C.

In some implementations, the 3D descriptors identification engine 122 may represent the virtual surface contours using EFDs after creating a concave bounding shape for each orthoscopic view. EFDs have been shown to be good representations of closed shapes, sparsely representing complex feature data. For this method, the 3D descriptors identification engine 122 chose anywhere from 10-30 Fourier descriptors to accurately represent the shapes of the teeth with a minimal number of features.

In some implementations, the 3D descriptors identification engine 122 may use an EFD with a set of four numbers per descriptor (an, bn, cn, dn) along with a location component, $(A_0, C_0)$, such that the original shape can be represented parametrically as:

$$x(t) = A_0 + \sum_{n=1}^{\infty} a_n \cos\frac{2n\pi t}{T} + b_n \sin\frac{2n\pi t}{T} \quad (1)$$

$$y(t) = C_0 + \sum_{n=1}^{\infty} c_n \cos\frac{2n\pi t}{T} + d_n \sin\frac{2n\pi t}{T} \quad (2)$$

where t ranges from 0 to T (for reconstruction, T can be taken as 1).

After computing the EFD for each view (top, front, side), the 3D descriptors identification engine 122 may normalize the EFD in order to provide rotation and size invariance. In this example, the EFD normalization process may involve moving the shape to the origin, finding the principal axis, rotating it to the X-axis, and scaling the length of the principal axis to ±1.

Depending on the sample size of teeth, this example normalization process can introduce some ambiguity in that each normalized shape can be represented in two rotations that are 180 degrees apart. In a typical classification scheme, this might not be an issue, but each 3D tooth shape in this system is represented by three separate orthoscopic views, each with an arbitrary rotation, yielding eight separate clusters of teeth. In very large sample sizes (e.g. 4,000 to 8,000 samples), the center of each cluster could be identified to find the sample closest to the center. However, with smaller sample sizes (e.g., less than 1500 teeth), each cluster would contain, on average, fewer than 200 shapes, and finding the center of the cluster would prove difficult.

Figure 3:
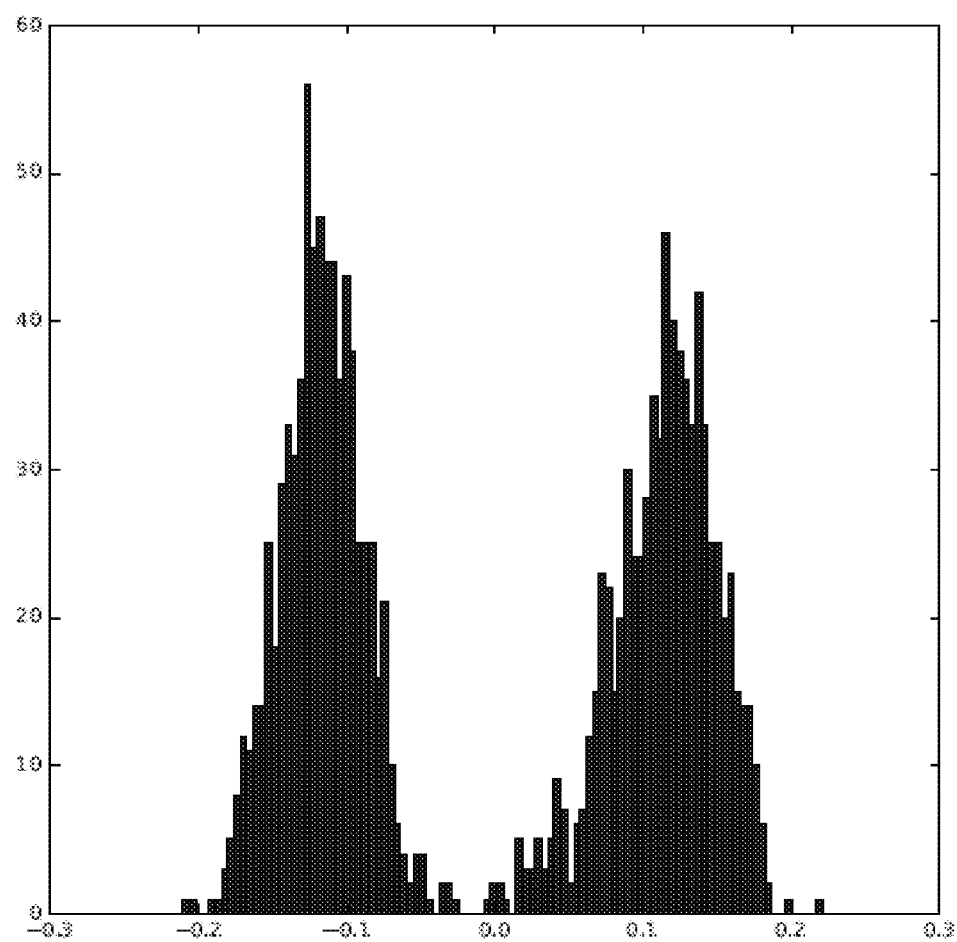
FIGS. 3 and 4 are diagrams showing distributions of the first principal component of one of the orthoscopic EFDs before (FIG. 3) and after (FIG. 4) normalization.
Figure 4:
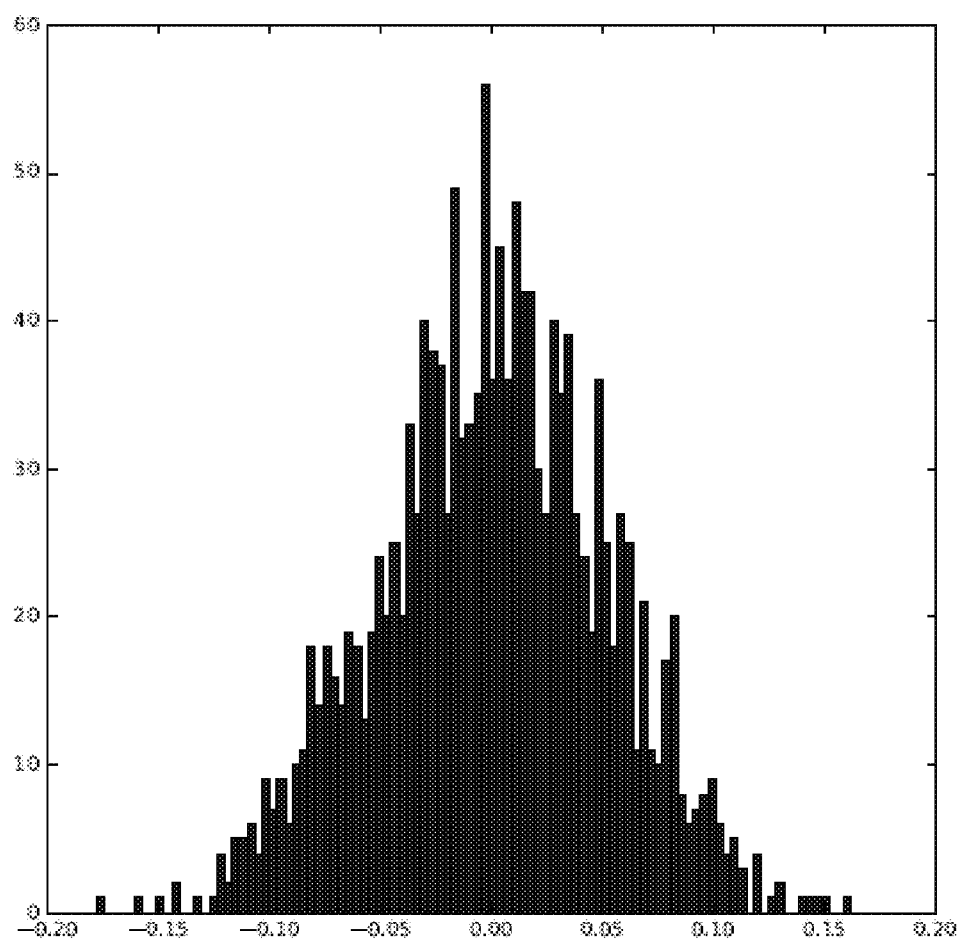

In one embodiment, the 3D descriptors identification engine 122 may present a solution to the rotational ambiguity by computing all of the normalized EFDs, and then for each view (top, front, and side), compute the first principal component of the normalized EFDs. In cases where the first principal component is negative, the 3D descriptors identification engine 122 may rotate normalized descriptors by multiplying each even-numbered descriptor by −1 which corresponds to a 180 rotation in the normalized elliptic Fourier space. FIGS. 3 and 4 show distributions of the first principal component of one of the orthoscopic EFDs before (FIG. 3) and after (FIG. 4) the disambiguation.

In some implementations, the 3D descriptors identification engine 122 represents virtual surface contours using 3D descriptors comprising spherical harmonics. It is noted that spherical harmonics may more accurately characterize the 3D shape of a tooth than other techniques. Spherical harmonic techniques may facilitate computing spherical harmonics for each tooth over a set of normalized radii. These example methods may prove useful in the retrieval of 3D imagery, particularly due to the rotational invariance of a particular 3D virtual representation of a tooth.

As noted, in some implementations, the 3D descriptors identification engine 122 represents virtual surface contours using 3D descriptors comprising spherical harmonics. In some implementations, the spherical harmonics are analogous to Fourier descriptors, except that they operate on functions defined over a sphere. In general, any function $f(r, \theta, \phi)$ can be represented as an infinite sum of spherical harmonics:

$$f(r, \theta, \varphi) = \sum_{\ell=0}^{\infty} \sum_{m=-\ell}^{\ell} f_\ell^m r^\ell Y_\ell^m(\theta, \varphi) \quad (3)$$

where $f_\ell$ is a constant, $r_\ell$ is a scaling factor, $$Y_\ell^m(\theta, \varphi) = \sqrt{\frac{(2\ell+1)}{4\pi}\frac{(\ell-m)!}{(\ell+m)!}} \, P_\ell^m(\cos\theta)e^{im\varphi} \quad (4)$$

and $P_\ell^m$ is the associated polynomial defined as:

$$P_\ell^m(x) = \frac{(-1)^m}{2^\ell \ell!}(1-x^2)^{m/2}\frac{d^{\ell+m}}{dx^{\ell+m}}(x^2-1)^\ell \quad (5)$$

In some implementations, the number of harmonics can be truncated to some finite number large enough to capture the frequency characteristics of the original function.

The 3D descriptors identification engine 122 may use multiple approaches to compute the spherical harmonics for a particular tooth. Under a first approach, the 3D descriptors identification engine 122 may normalize a 3D virtual representation of a tooth by centering and scaling so that the size of the longest axis of the 3D virtual representation of the tooth (usually the Z axis) ranges from −1 to 1. Once the 3D descriptors identification engine 122 has normalized the 3D virtual representation of the tooth, the 3D descriptors identification engine 122 may voxelize the surface of the tooth into an array of an arbitrary size (e.g., size 64×64×64 used in some examples). The 3D descriptors identification engine 122 may create a voxelized sphere, S, of radius r, using any spatial parameters, including but not limited to polar coordinates $(r, \theta, \phi)$ where r varies between two arbitrary integers (in some examples, from 1 to 32). The 3D descriptors identification engine 122 may further use the coordinates of S to index into the voxelization of the tooth shape. For each point in S where the voxel is set to 1 (i.e., which is a discretized location of the tooth exterior), 3D descriptors identification engine 122 may compute a sum of the spherical harmonics for a given frequency, F. By varying the range of F from, e.g., 1 to 16 and the radius r from, e.g., 1 to 32, the 3D descriptors identification engine 122 may create a spherical harmonic based signature for the tooth in question. An example of this process is described in detail in Algorithm 2, below:

---

Algorithm 2 Algorithm to generate a spherical-harmoic signature based on [3]

1: Create empty signature, sig ← array(32, 16)
2: Find the center of the tooth, c
3: Center the tooth, T, by updating in each vertex v ←
   v − c; ∀v ∈ T
4: Find the length of the tooth in each dimension,
   $l_x, l_y, l_z$, ← max($v_x, v_y, v_z$) − min($v_x, v_y, v_z$)>
5: Find the scale of the tooth as L ← max($l_x, l_y, l_z$)
6: Scale the tooth, v ← v/L; ∀v ∈ T
7: Create the voxel array, V ← zeros(64 × 64 × 64)
8: for v ∈ T do
9:    p ← int(32 * v)
10:   V[p] ← 1
11: end for
12: for r ← 1 . . . 32 do
13:   Generate voxelized sphere, S with radius r
14:   for F ← 1 . . . 16 do
15:     sig(r, F) ← $\Sigma_{s\in S} \Sigma_{m=-F}^{F} V[s]Y_F^m(s_\theta, s_\phi)$
16:   end for
17: end for

---

Under a second approach, the 3D descriptors identification engine 122 may avoid voxelization of the surface of the 3D object. Once again, the 3D descriptors identification engine 122 may compute the spherical harmonic signature of a 3D virtual representation of a tooth by centering the 3D virtual representation of the tooth to normalize it. Then, in some implementations, the 3D descriptors identification engine 122 may convert one or more of the vertices from one set of spatial parameters to another set of spatial parameters (e.g., from Cartesian coordinates (x, y, z) to spherical coordinates $(r, \theta, \phi)$). The 3D descriptors identification engine 122 may implement a scaling process to normalize the tooth so that the maximum r value is a specific value (e.g., 1). For a first integer set (e.g., 32) of radii ranges, from one value to another (e.g., 0 to 1), the 3D descriptors identification engine 122 can select all vertices within a given radii range. The 3D descriptors identification engine 122 may further compute the sum of the spherical harmonics for each frequency F. By varying the range of F from 1 to 16 and the radius range r from 0 to 1, 3D descriptors identification engine 122 may create a spherical harmonic based signature.

Different teeth representations can have a differing number of vertices. In the first approach, the 3D descriptors identification engine 122 may normalize the number of points in the spherical harmonic signature through the voxelization process. In the second approach, the 3D descriptors identification engine 122 may divide the signature by the number of vertices in each radius range, as described in more detail in Algorithm 3 below:

---

Algorithm 3 Algorithm to generate a spherical-harmonic signature without voxelization 1: Create empty signature, sig ← array(32,16)
2: Find the center of the tooth, c
3: Center the tooth, T, by updating each vertex v ← v − c; ∀v ∈ T
4: Convert each vertex from Cartesian coordinates to spherical
   coordinates
5: Find the scale of the tooth as L ← max($v_r$); ∀v ∈ T
6: Scale the tooth, v ← v/L; ∀v ∈ T
7: Generate the radius ranges R = 0, 1/32, 2/32, . . . , 1
8: for i ← 0 . . . 31 do
9:    S ← {v ∈ T | R [i] < $v_r$ ≤ R[i + 1]}
10:   for F ← 1 . . . 16 do
11:     sig(r, F) ← $\Sigma_{s\in S} \Sigma_{m=-F}^{F} Y_F^m(s_\theta, s_\phi)$
12:   end for
13:   
   $$sig(r, \ldots) \leftarrow \frac{1}{|S|}sig(r, \ldots)$$

14: end for

---

The descriptor distance analysis engine 124 may implement one or more automated agents configured to identify descriptor distances between 3D descriptors in the 3D descriptor space formed by the 3D descriptors for a specific tooth type. In some implementations, the descriptor distance analysis engine 124 identifies differences in descriptor locations of specific 3D descriptors. The descriptor distance analysis engine 124 may further identify a minimum distance for a given 3D descriptor space of a tooth type.

In some implementations (e.g., some in which 3D descriptors comprise EFDs), the descriptor distance analysis engine 124 may perform a principal component analysis (PCA) to identify descriptor distances; the descriptor distance analysis engine 124 may identify which PCAs of 3D descriptors are minimum, are 0, or are substantially 0. In implementations (e.g., some in which 3D descriptors comprise spherical harmonic representations), the descriptor distance analysis engine 124 may identify Euclidean distance(s) between 3D descriptors and/or taking ℓ 2 norm(s) of rows of matrices embodied in the 3D descriptor datastore 114. The descriptor distance analysis engine 124 may operate to provide descriptor distances between 3D descriptors to other modules, such as the representative 3D descriptor assignment engine 126.

The representative 3D descriptor assignment engine 126 may implement one or more automated agents configured to identify a representative 3D descriptor for a tooth type. In some implementations, the representative 3D descriptor assignment engine 126 bases the representative 3D descriptor on descriptor distances. As an example, the representative 3D descriptor assignment engine 126 may select a 3D descriptor having a minimum distance from other 3D descriptors corresponding to the same tooth type as a representative 3D descriptor. In some implementations, the representative 3D descriptor may correspond to a representation of an "average" or "optimal" shape for a tooth type.

In some implementations, the representative 3D descriptor assignment engine facilitates ranking a set of teeth in order of normality. For example, the top 10 "most representative" teeth for a sample set of teeth, as found by the representative 3D descriptor assignment engine 126 via EFDs, can be seen in Table 1, in which the score for each individual sample is listed in the "Score" column and the digital file linking to the individual tooth sample is listed in the "STL File" column:

TABLE 1

"Most representative" teeth for EFD

| Score | STL File |
| --- | --- |
| 0.0026 | <Redacted> |
| 0.0029 | <Redacted> |
| 0.0030 | <Redacted> |
| 0.0033 | <Redacted> |
| 0.0034 | <Redacted> |
| 0.0034 | <Redacted> |
| 0.0035 | <Redacted> |
| 0.0035 | <Redacted> |
| 0.0037 | <Redacted> |
| 0.0038 | <Redacted> |

Likewise, the top 10 "least representative" teeth found by the representative 3D descriptor assignment engine 126 via the EFD method for a sample set of teeth can be seen in Table 2, in which the score for each individual sample is listed in the "Score" column and the digital file linking to the individual tooth sample is listed in the "STL File" column:

TABLE 2

"Least representative" teeth for EFD

| Score | STL File |
| --- | --- |
| 0.0650 | <Redacted> |
| 0.0651 | <Redacted> |
| 0.0673 | <Redacted> |
| 0.0677 | <Redacted> |
| 0.0683 | <Redacted> |
| 0.0699 | <Redacted> |
| 0.0709 | <Redacted> |
| 0.0765 | <Redacted> |
| 0.0778 | <Redacted> |
| 0.0791 | <Redacted> |

Figure 5:
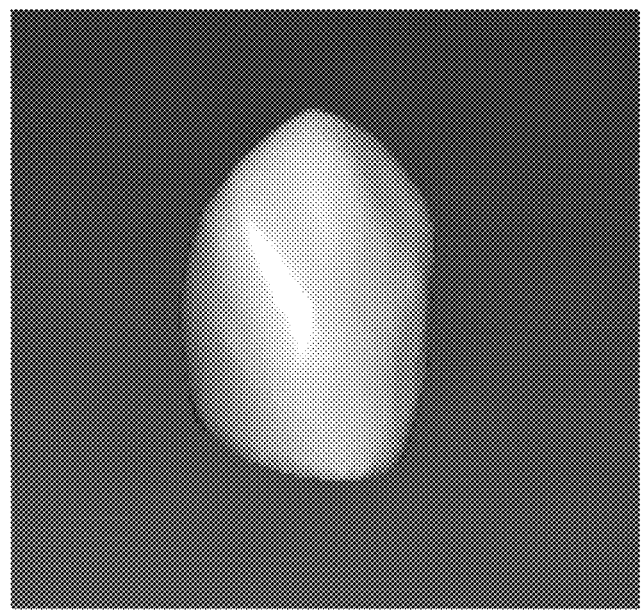
FIG. 5 is a diagram showing the "most average" tooth shape resulting from the EFD method.
Figure 6:
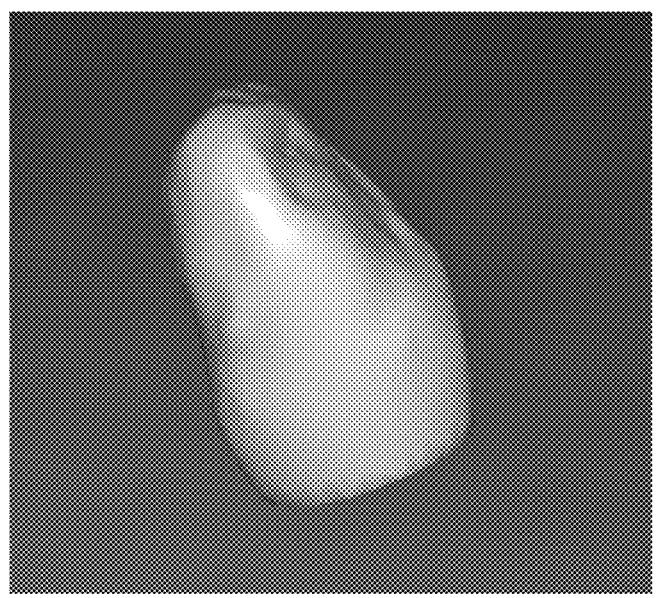
FIG. 6 is a diagram showing the "least average" tooth shape resulting from the EFD method.

The "most representative" tooth resulting from an example of an EFD method performed by the representative 3D descriptor assignment engine 126 is shown in FIG. 5, and the "least representative" tooth resulting from an example of an EFD method performed by the representative 3D descriptor assignment engine 126 is shown in FIG. 6.

Figure 7:
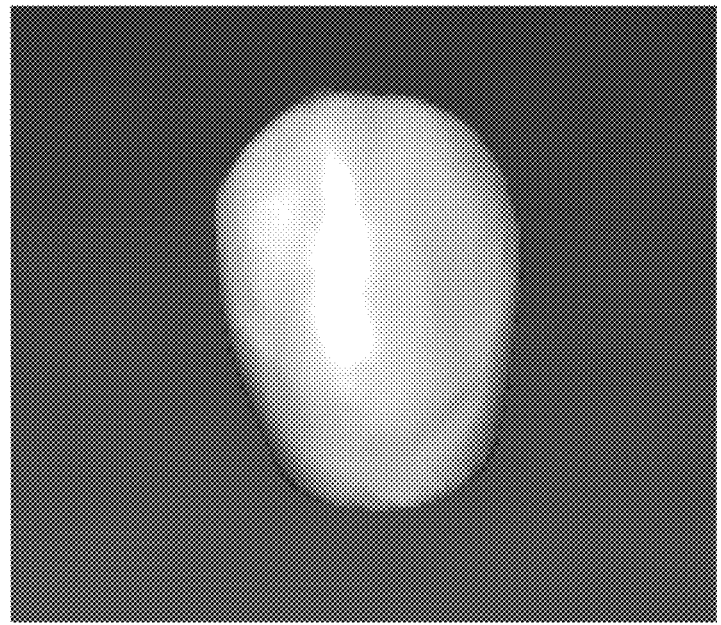
FIG. 7 is a diagram showing the "most average" tooth shape resulting from the spherical harmonics method.
Figure 8:
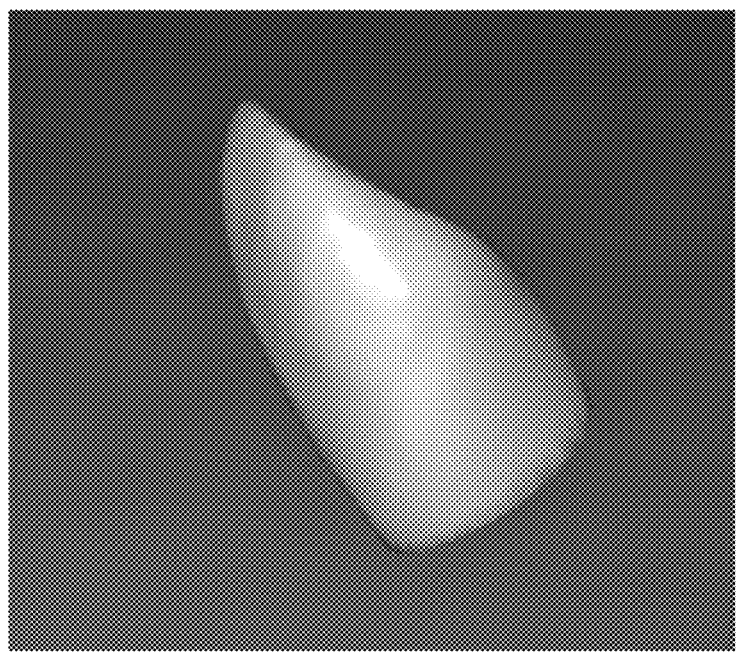
FIG. 8 is a diagram showing the "least average" tooth shape resulting from the spherical harmonics method.

In a similar manner, in some implementations, the representative 3D descriptor assignment engine 126 may determine the top 10 "most average" and "least average" teeth can be determined for the spherical harmonic method (see Tables 3 and 4, respectively) with the best and worst teeth seen in FIGS. 7 and 8.

TABLE 3

"Most representative" teeth for spherical harmonics

| Score | STL File |
| --- | --- |
| 71.3577326 | <Redacted> |
| 73.3774578 | <Redacted> |
| 75.9055045 | <Redacted> |
| 76.2979777 | <Redacted> |
| 76.6726197 | <Redacted> |
| 77.5958384 | <Redacted> |
| 77.9117356 | <Redacted> |
| 78.1144551 | <Redacted> |
| 78.2615031 | <Redacted> |
| 78.4348530 | <Redacted> |

TABLE 4

"Least representative" teeth for spherical harmonics

| Score | STL File |
| --- | --- |
| 123.1364272 | <Redacted> |
| 123.4200720 | <Redacted> |
| 123.6039287 | <Redacted> |
| 123.7421478 | <Redacted> |
| 124.6166645 | <Redacted> |
| 127.0011129 | <Redacted> |
| 128.8748830 | <Redacted> |
| 130.7281688 | <Redacted> |
| 134.2232485 | <Redacted> |
| 139.0518147 | <Redacted> |

As noted herein, the representative 3D descriptor assignment engine 126 may store a representative 3D descriptor for a tooth type in the 3D descriptor datastore 104. The representative 3D descriptor may be indexed by tooth type so that it can be used to identify the shape and/or size of a portion of an aligner to accommodate an at least partially un-erupted tooth.

Figure 1C:
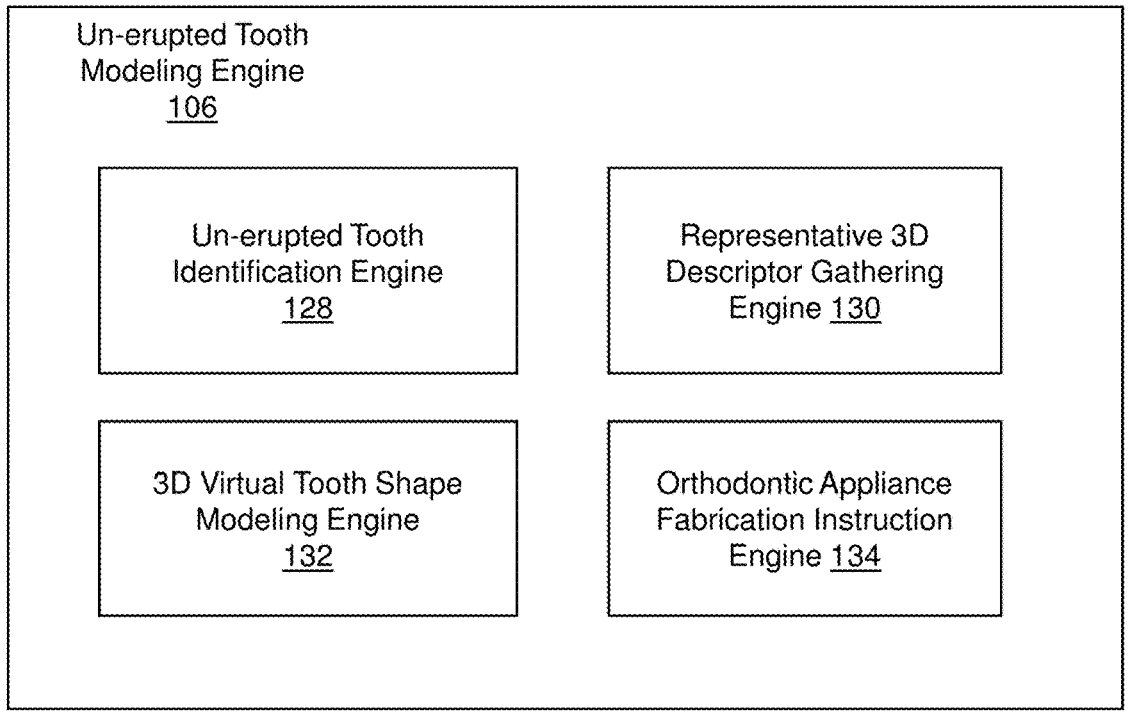
FIG. 1C is a diagram showing an example of un-erupted tooth modeling engine(s).

FIG. 1C is a diagram showing an example of the un-erupted tooth modeling engine(s) 106. The un-erupted tooth modeling engine(s) 106 may include an un-erupted tooth identification engine 128, a representative 3D descriptor gathering engine 130, a 3D virtual shape modeling engine 132, and an orthodontic appliance (e.g., aligner, palatal expander, etc.) fabrication instruction engine 134. One or more of the modules of the un-erupted tooth modeling engine(s) 106 may be coupled to one another (e.g., through the example couplings shown in FIG. 1C) or to modules not explicitly shown in FIG. 1B.

The un-erupted tooth identification engine 128 may implement one or more automated agents configured to identify one or more un-erupted teeth to be modeled. In some implementations, the un-erupted tooth identification engine 128 receives anatomical tooth identifiers of un-erupted teeth through manual input or through an automated system. In an implementation, the un-erupted tooth identification engine 128 may receive tooth numbers and/or character strings input by a medical professional corresponding to an un-erupted tooth of a patient. In various implementations, the un-erupted tooth identification engine 128 may receive the results of a scan (e.g., an optical scan) or a virtual representation of a dental mold that identifies un-erupted teeth. The un-erupted tooth identification engine 128 may provide identifiers of one or more teeth to other modules, such as the representative 3D descriptor gathering engine 130. In some implementations, this may involve the un-erupted tooth identification engine 128 providing anatomical tooth identifiers. This can be performed in other ways as well.

The representative 3D descriptor gathering engine 130 may implement one or more automated agents configured to gather one or more representative 3D descriptor for a tooth type from the 3D descriptor datastore 114. The representative 3D descriptor gathering engine 130 may use anatomical tooth identifiers to gather what the automated tooth model learning engine(s) 104 stored in the 3D descriptor datastore 114 as a representative 3D descriptor for a tooth type. The representative 3D descriptor gathering engine 130 may provide the representative 3D descriptor to other modules, such as the 3D virtual tooth shape modeling engine 132.

The 3D virtual tooth shape modeling engine 132 may implement one or more automated agents configured to identify visual parameters of a representative tooth of a tooth type using the representative 3D descriptor for the tooth type, The 3D virtual tooth shape modeling engine 132 may implement one or more specialized graphics rendering engines. In some implementations, the representative 3D virtual tooth shape modeling engine 132 forms a virtual 3D tooth shape for an at least partially un-erupted tooth using the 3D descriptor for the tooth type associated with the at least partially un-erupted tooth. The virtual 3D tooth shape may include virtual contours that represent the surfaces of the at least partially un-erupted tooth. In some implementations, the 3D virtual tooth shape modeling engine 132 may scale the 3D virtual tooth shape to match the anticipated size of the at least partially un-erupted tooth of the patient.

The aligner fabrication instruction engine 134 may implement one or more automated agents configured to provide instructions to form parts of aligners using the virtual 3D tooth shape. The aligner fabrication instruction engine 134 may provide the orthodontic appliance fabrication engine(s) 108 with instructions to 3D print and/or thermoform aligners, in various implementations.

Example Flowcharts of Methods of Operation

Figure 1D:
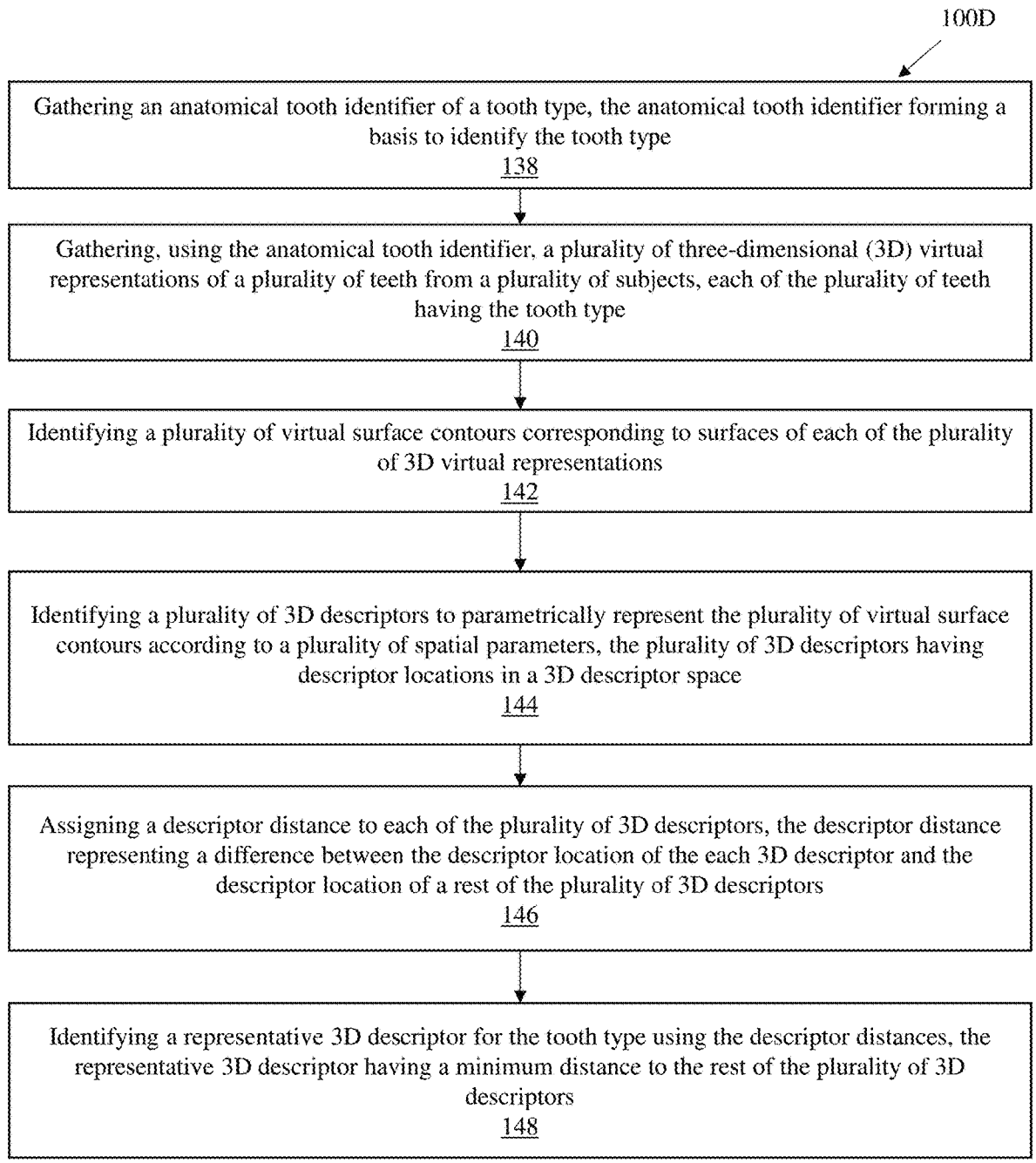
FIG. 1D is a flowchart of an example of a method of identifying a representative three-dimensional descriptor of a tooth type.

FIG. 1D is a flowchart of an example of a method 100D of identifying a representative three-dimensional descriptor of a tooth type. The method 100D is discussed in conjunction with the structures of the automated tooth model learning engine(s) 104. It is noted the method 100D may have fewer or additional operations, and that structures other than the automated tooth model learning engine(s) 104 may perform operations of the method 100D.

At an operation 138, an anatomical tooth identifier of a tooth type may be gathered. In some implementations, the anatomical tooth identifier forms a basis to identify the tooth type. The anatomical tooth identifier may comprise a tooth number, a character string, and/or graphical data corresponding to the tooth type. As noted herein, the tooth type identifier gathering engine 116 may gather an anatomical tooth identifier as part of a tooth model automated learning process for that tooth type. In various implementations, the tooth type identifier gathering engine 116 may sequentially input two or more tooth types so that representative 3D descriptors for those tooth types can be learned through the automated systems described herein.

At an operation 140, a plurality of three-dimensional (3D) virtual representations of a plurality of teeth from a plurality of subjects may be gathered using the anatomical tooth identifier. Each of the plurality of teeth may have the tooth type. The 3D virtual representation gathering engine 116 may gather from the 3D virtual representation datastore 112 two or more 3D representations of a plurality of teeth from a plurality of subjects may be gathered using the anatomical tooth identifier. As noted herein, the 3D virtual representation may have one or more virtual surfaces that model physical surfaces of teeth on images captured from/modeled by the plurality of subjects.

At an operation 142, a plurality of virtual surface contours corresponding to surfaces of each of the plurality of 3D virtual representations may be identified. The virtual surface contour identification engine 118 may perform an analysis of 3D virtual representations of different teeth of a tooth type to identify portions of the 3D virtual representations that indicate separation from open space. One-dimensional curves, and two-dimensional contours may be mapped out and/or stored.

At an operation 144, a plurality of 3D descriptors to parametrically represent the plurality of virtual surface contours according to a plurality of spatial parameters may be identified. In some implementations, the plurality of 3D descriptors have descriptor locations in a 3D descriptor space. The 3D descriptor identification engine 120 may identify a plurality of 3D descriptors to parametrically represent the plurality of virtual surface contours according to a plurality of spatial parameters. As noted herein, in some implementations, EFDs, spherical harmonic descriptors involving voxelized spheres, and/or spherical harmonic descriptors involving non-voxelized spheres, among other descriptors, may be used to parametrically represent the plurality of virtual surface contours according to a plurality of spatial parameters.

At an operation 146, a descriptor distance may be assigned to each of the plurality of 3D descriptors. In various implementations, the descriptor distance may represent a difference between the descriptor location one of the 3D descriptors and the descriptor location of rest of the plurality of 3D descriptors. The descriptor distance analysis engine 122 may, e.g., use appropriate descriptor distance techniques (as discussed herein) to identify distances between specific 3D descriptors and other 3D descriptors for a tooth type.

At an operation 148, a representative 3D descriptor for the tooth type may be identified using the descriptor distances. In some implementations, the representative 3D descriptor may have a minimum distance to the rest of the plurality of 3D descriptors. As an example, the representative 3D descriptor may reside closer in the 3D descriptor space to other in that 3D descriptor space than any of the other 3D descriptors reside to any of the 3D descriptors in that 3D descriptor space. The representative 3D descriptor assignment engine 124 may identify such a representative 3D descriptor for a tooth type and may store such a representative 3D descriptor in the 3D descriptor datastore 114.

Figure 1E:
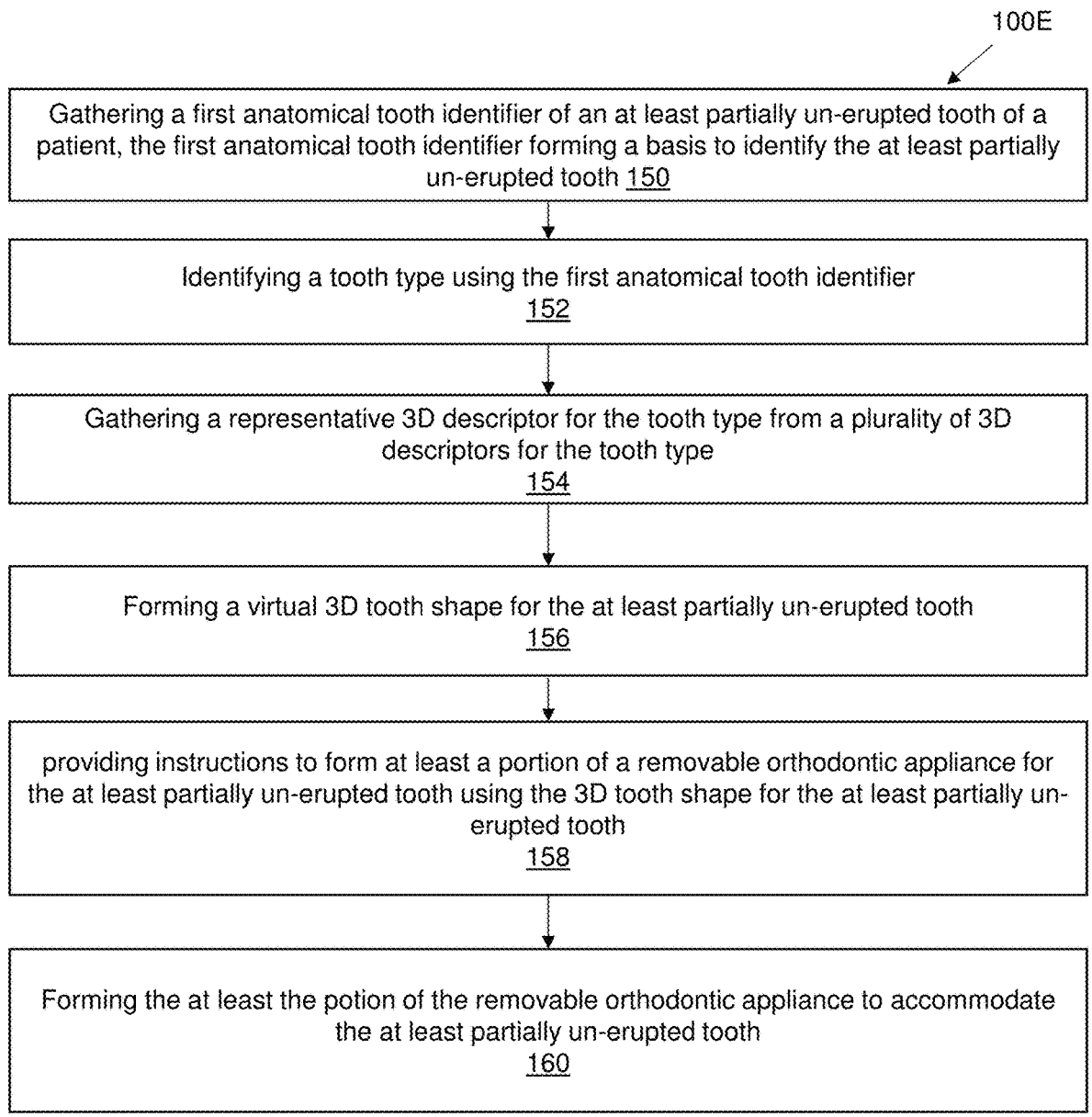
FIG. 1E is a flowchart of an example of a method of forming at least a portion of a removable orthodontic appliance for an un-erupted tooth.

FIG. 1E is a flowchart of an example of a method 100E of forming at least a portion of a removable orthodontic appliance for an un-erupted tooth. The method 100E is discussed in conjunction with the structures of the un-erupted tooth modeling engine 106. It is noted the method 100E may have fewer or additional operations, and that structures other than the un-erupted tooth modeling engine 106 may perform operations of the method 100E.

At an operation 150, a first anatomical tooth identifier of an at least partially un-erupted tooth of a patient may be gathered. In some implementations, the first anatomical tooth identifier forms a basis to identify the at least partially un-erupted tooth 150. The un-erupted tooth identification engine 130 may gather a first anatomical tooth identifier of an at least partially un-erupted tooth of a patient in some implementations. The first anatomical tooth identifier may comprise a tooth number, a character string, and/or graphical data corresponding to the tooth type. In some implementations, the operation 150 may be part of identifying whether a patient's arch contains at least partially un-erupted teeth. Such identification may be made manually or automatically (e.g., using a computing device). For example, identification can be made by a dental practitioner evaluating the patient's teeth or arch, or alternatively, can be performed by a computing system automatically by evaluating data (such as a scan or dental impression) of the patient's teeth or arch.

At an operation 152, a tooth type may be identified using the first anatomical tooth identifier. In some implementations, the un-erupted tooth identification engine 130 may identify a tooth type using the first anatomical tooth identifier. The un-erupted tooth identification engine 130 may evaluate the tooth type using data from the tooth type identifier datastore 110.

At an operation 154, a representative 3D descriptor for the tooth type may be gathered from a plurality of 3D descriptors for the tooth type. In various implementations, the representative 3D descriptor gathering engine 12 may gather a representative 3D descriptor for a tooth type from the 3D descriptor datastore 114. As noted herein, the 3D descriptor datastore 114 may have been populated by the tooth model automated learning engine(s) 104 using the automated learning techniques described further herein.

At an operation 156, a virtual 3D tooth shape for the at least partially un-erupted tooth may be formed. In various implementations, the 3D virtual tooth shape modeling engine 134 may form a virtual 3D tooth shape for the at least partially un-erupted tooth. This may involve providing instructions to one or more graphics engines to render the virtual 3D tooth shape and/or parameters of the virtual 3D tooth shape.

At an operation 158, instructions to form at least a portion of a removable orthodontic appliance for the at least partially un-erupted tooth using the virtual 3D tooth shape for the at least partially un-erupted tooth may be provided. The aligner fabrication engine 136 may translate the virtual 3D tooth shape into specific parameters of a removable orthodontic appliance for the at least partially un-erupted tooth.

At an operation 160, the at least the portion of the removable orthodontic appliance to accommodate the at least partially un-erupted tooth may be formed. The orthodontic appliance fabrication engine(s) 108 may form relevant portions of the removable orthodontic appliance using various techniques, e.g., 3D printing, thermoforming, etc. Advantageously, the portion of the aligner will appear natural and will provide a secure yet comfortable fit for an at least partially un-erupted tooth. The methods herein allow identification of a representative tooth shape for use in orthodontic applications before all of the patient's permanent teeth have erupted. As noted herein, some implementations use orthoscopic views, elliptic Fourier descriptors, and principal component analysis. Some implementations use computing a three dimensional signature using spherical harmonics. The methods described herein can be integrated into an orthodontic treatment plan when a patient has been identified as having one or more un-erupted or erupting teeth.

Figure 1F:
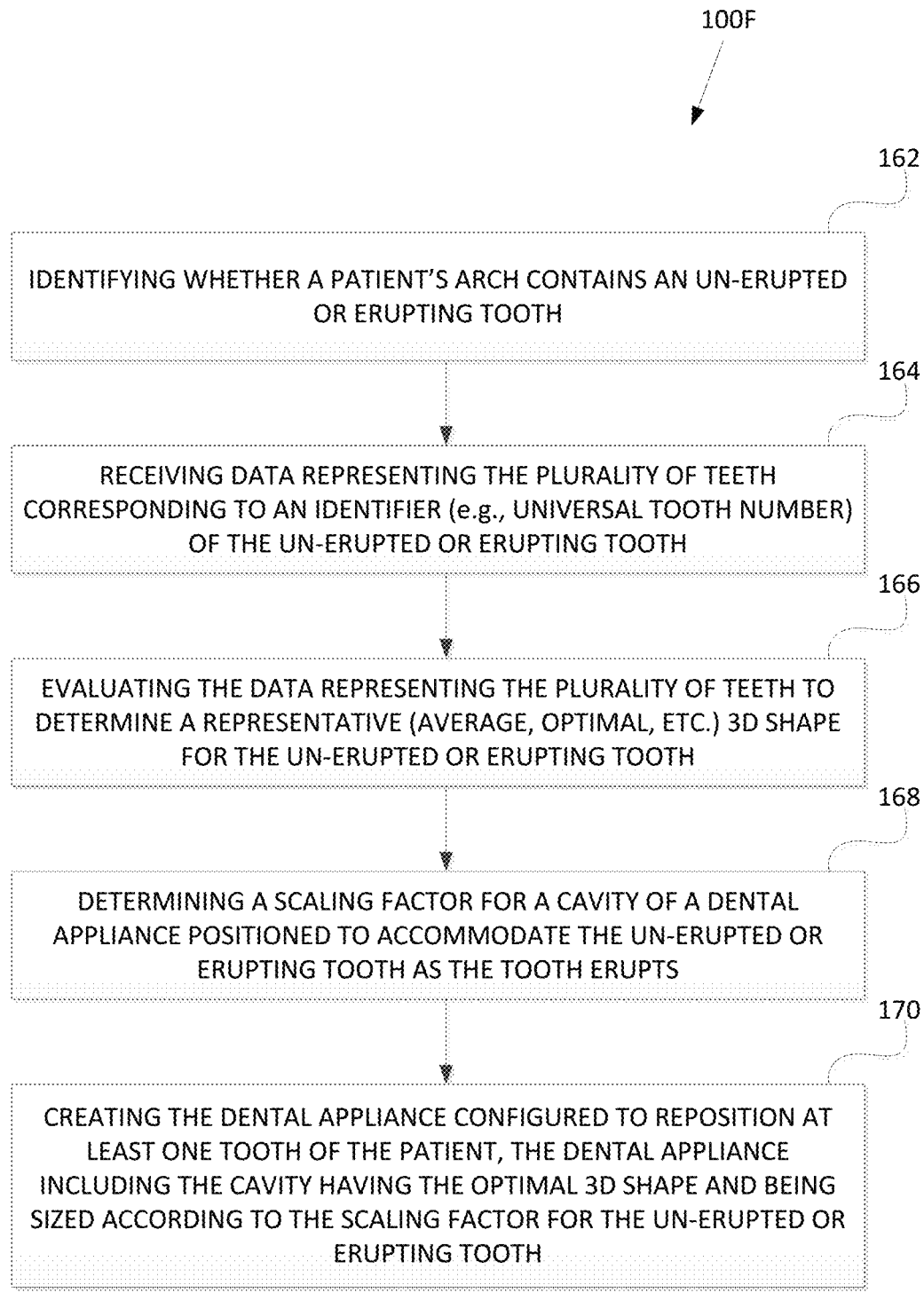
FIG. 1F is a flowchart of an example of a method for accommodating an un-erupted or erupting tooth during a proposed orthodontic treatment.

FIG. 1F is a flowchart of an example of one method of accommodating an at least partially un-erupted tooth during a proposed orthodontic treatment. In FIG. 1F, the method 100F may initially include identifying (e.g., via computing device or manually) whether a patient's arch contains an un-erupted or erupting tooth 162. The identification can be performed by a dental practitioner and directly inputted into the computing device, or can be identified by the computing device itself by evaluating data representing the patient's arch (e.g., a scan or dental impression of the patient).

The method can further include receiving, via the computing device, data representing a plurality of teeth corresponding to a universal tooth number of the un-erupted or erupting tooth 164. In some embodiments, the data can be generated by scanning a plurality of samples of teeth with a 3D scanner or obtaining dental impressions of a plurality of samples of teeth. The data can include information regarding the shape, size, and orientation for each of the teeth in the Universal Numbering System.

In any of the apparatuses and methods described herein, multiple samples of teeth corresponding to each tooth number of the Universal Numbering System can be evaluated to compute a representative 3D representation for each tooth number. As used herein, "universal tooth number" refers to a specific tooth within the Universal Numbering System of dental notation. For example, a tooth having a "universal tooth number" of "Tooth 6" can refer to the upper-right canine tooth. For purposes of the disclosure herein, ~1500 samples of the upper-right canine tooth, Tooth 6 in the Universal Numbering System, were scanned (either directly or from a dental impression) and evaluated to determine a representative 3D representation of an upper-right canine tooth.

It should be understood the methods and techniques used herein to determine the representative tooth can be applied to any tooth in the Universal Numbering System, and that any number of samples can be evaluated to determine the representative tooth. Once the representative shape is determined for each tooth, the shapes can be scaled in size for use in orthodontic aligners where the patient's permanent teeth have not all yet erupted.

Returning to FIG. 1F, the method can further include evaluating the data representing the plurality of teeth (e.g., with a technique) to determine an optimal 3D shape for the un-erupted or erupting teeth after they have fully erupted 166. This estimation may be done in any appropriate manner, including using any appropriate technique, as will be described in greater detail herein. For example, in one embodiment the evaluating step can comprise the 2D Elliptic Fourier Descriptors method. The evaluating step can include the use of a Spherical Harmonics method. For example, a modeling technique may include generating two-dimensional top, front, and side views from the data representing the plurality of teeth, and representing the convex bounding shape for each two-dimensional top, front, and side view using elliptic Fourier descriptors. The modeling technique can further comprise computing a principal component analysis to find the optimal 3D shape for the cavity from the data representing the plurality of teeth.

The modeling technique may include summing spherical harmonics for each point of a voxelized sphere over a specific frequency range to compute a spherical harmonic signature for each tooth. The modeling technique can further comprise computing a Euclidean distance between each tooth's spherical harmonic signature to find the optimal 3D shape for the cavity from the data representing the plurality of teeth.

Any of these methods can further include determining a scaling factor (e.g., via the computing device) for a cavity of a dental appliance positioned to accommodate the un-erupted or erupting tooth as the tooth erupts 168. The scaling factor may allow the optimal 3D shape to be scaled in size for use in an orthodontic aligner.

Any of these methods can further include creating the dental appliance configured to reposition at least one tooth of the patient 170. The dental appliance may include a cavity having the optimal 3D shape and being sized according to the scaling factor for the un-erupted or erupting tooth. A dental appliance (or series of dental appliances) can be fabricated according to the data processing system 500 described in greater detail below.

As mentioned above the methods and apparatuses (e.g., systems, devices, software, firmware, etc.) described herein may generally include evaluating data to determine a 3D shape for the un-erupted or erupting shape. Examples (and exemplary techniques) of performing this evaluation are described below. For example, a technique for evaluating data representing a plurality of teeth with Elliptic Fourier Descriptors to determine an optimal 3D shape for a patient's un-erupted or erupting teeth after they have fully erupted is provided.

Figure 9:
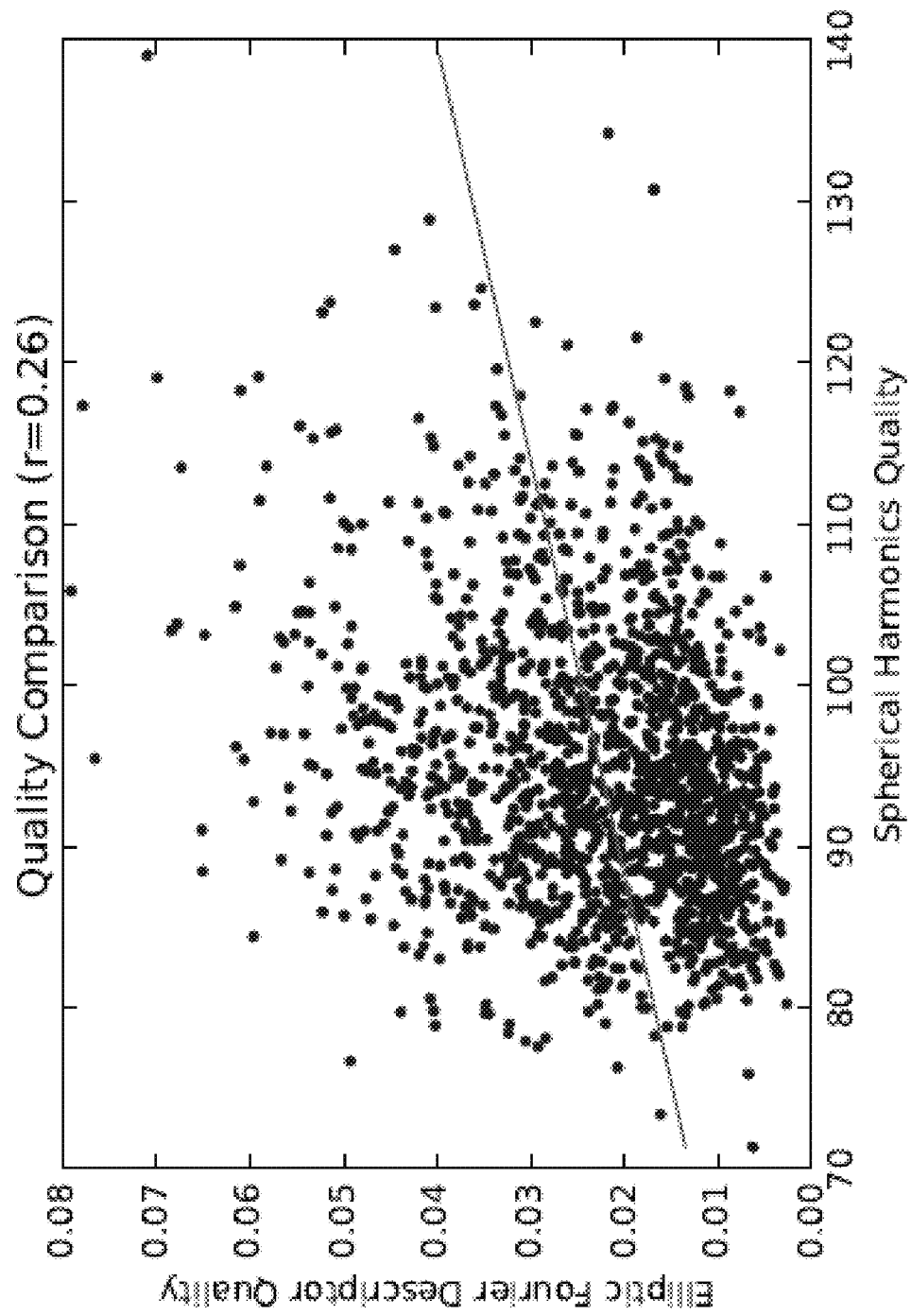
FIG. 9 is a diagram comparing the quality of tooth shapes selected using the EFD and spherical harmonics methods.

FIG. 9 compares the quality of the teeth provided by both the EFD and spherical harmonics solutions, shown on the X and Y axes. As can be seen in FIG. 9, both methods are in loose correlation, having a Pearson's r value of 0.26.

While there is some correlation between the two methods, subjectively speaking, the spherical harmonic representation overall appears to perform better than the EFD representation. This is, in part, an expected result, as the 2D projections of the EFD method may mask significant abnormalities in tooth structure that can be captured in the 3D representation of the spherical harmonics technique.

Example of a Computing System

Figure 10:
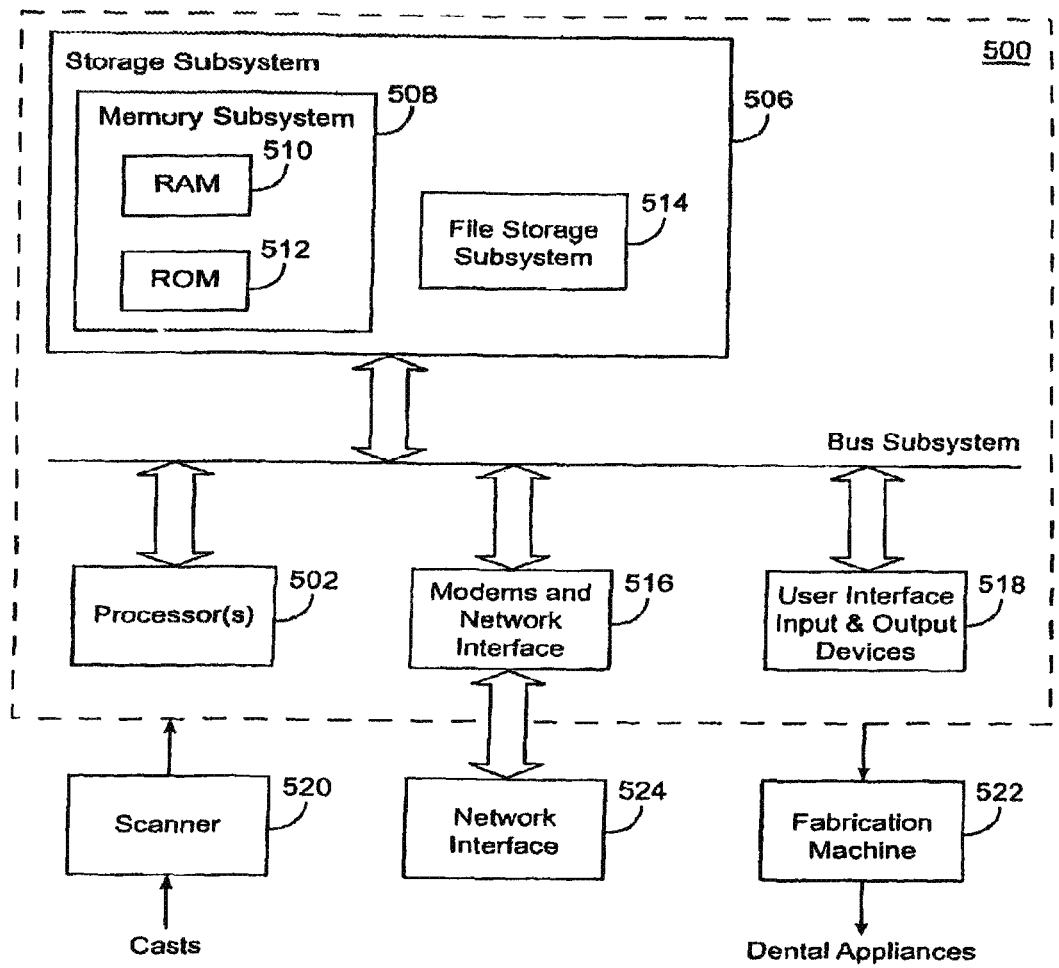
FIG. 10 is a simplified block diagram of an example of a data processing system for designing and manufacturing an orthodontic aligner.

The methods described herein may be performed by an apparatus, such as a data processing system, which may include hardware, software, and/or firmware for performing many of these steps described above. For example, FIG. 10 is a simplified block diagram of a data processing system 500. Data processing system 500 typically includes at least one processor 502 which communicates with a number of peripheral devices over bus subsystem 504. These peripheral devices typically include a storage subsystem 506 (memory subsystem 508 and file storage subsystem 514), a set of user interface input and output devices 518, and an interface to outside networks 516, including the public switched telephone network. This interface is shown schematically as "Modems and Network Interface" block 516, and is coupled to corresponding interface devices in other data processing systems over communication network interface 524. Data processing system 500 may include a terminal or a low-end personal computer or a high-end personal computer, workstation or mainframe.

The user interface input devices typically include a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, may be used.

User interface output devices may include a printer and a display subsystem, which includes a display controller and a display device coupled to the controller. The display device may be a cathode ray tube (CRT), a flat-panel device such as a liquid crystal display (LCD), or a projection device. The display subsystem may also provide nonvisual display such as audio output.

Storage subsystem 506 maintains the basic programming and data constructs that provide the functionality of the present invention. The software modules discussed above are typically stored in storage subsystem 506. Storage subsystem 506 typically comprises memory subsystem 508 and file storage subsystem 514.

Memory subsystem 508 typically includes a number of memories including a main random access memory (RAM) 510 for storage of instructions and data during program execution and a read only memory (ROM) 512 in which fixed instructions are stored. In the case of Macintosh-compatible personal computers the ROM would include portions of the operating system; in the case of IBM-compatible personal computers, this would include the BIOS (basic input/output system).

File storage subsystem 514 provides persistent (nonvolatile) storage for program and data files, and typically includes at least one hard disk drive and at least one floppy disk drive (with associated removable media). There may also be other devices such as a CD-ROM drive and optical drives (all with their associated removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected over various local-area or wide-area network media, including telephone lines. Similarly, the input devices and display need not be at the same location as the processor, although it is anticipated that the present invention will most often be implemented in the context of PCS and workstations.

Bus subsystem 504 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

Scanner 520 is responsible for scanning casts of the patient's teeth obtained either from the patient or from an orthodontist and providing the scanned digital data set information to data processing system 500 for further processing. In a distributed environment, scanner 520 may be located at a remote location and communicate scanned digital data set information to data processing system 500 over network interface 524.

Fabrication machine 522 fabricates dental appliances based on intermediate and final data set information received from data processing system 500. In a distributed environment, fabrication machine 522 may be located at a remote location and receive data set information from data processing system 500 over network interface 524.

In the context of the present disclosure, processing system 500 can evaluate the data from a plurality of samples of teeth according to the methods and techniques described above to determine the "most average" tooth shape for each tooth in the Universal Tooth Numbering system. The "most average" tooth shape information can then be transmitted to the fabrication machine 522 to fabricate the individual dental appliances with cavities representing the "most average" tooth shape in the proper position of un-erupted or erupting teeth for each specific patient.

The dental appliance fabricated by the fabrication machine 522 can include a cavity for accommodating the un-erupted or erupting tooth, and can be designed to implement at least a portion of a treatment plan, comprising a shell having a plurality of cavities therein designed to receive teeth of a jaw with at least one of the plurality of cavities being a cavity for accommodating an un-erupted or erupting tooth therein, wherein at least one of a size, shape, location, and orientation of at least one of the cavities for accommodating an un-erupted or erupting tooth is designed based upon a evaluation of a sample of teeth that calculates an optimal 3D shape for the un-erupted or erupting tooth. The evaluation can comprise the techniques described above, specifically the 2D Elliptic Fourier Descriptors method and the Spherical Harmonics method.

In another embodiment, the system 500 of FIG. 10 can include a non-transitory computing device readable medium having instructions stored thereon that are executable by a processor to cause a computing device to receive, via a computing device, data representing a plurality of teeth, identify data indicating which of the plurality of teeth are un-erupted or erupting, determine an optimal 3D shape for each of the un-erupted or erupting teeth after they have fully erupted using a modeling technique, and generate a series of incremental tooth arrangements incorporating the optimal 3D shape into a cavity positioned over each of the un-erupted or erupting teeth to define a proposed orthodontic treatment.

Various alternatives, modifications, and equivalents may be used in lieu of the above components. Although the final position of the teeth may be determined using computer-aided techniques, a user may move the teeth into their final positions by independently manipulating one or more teeth while satisfying the constraints of the prescription.

Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program can be implemented in a high level procedural or object-oriented programming language to operate in conjunction with a computer system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Example of Orthodontic Aligners

Figure 11:
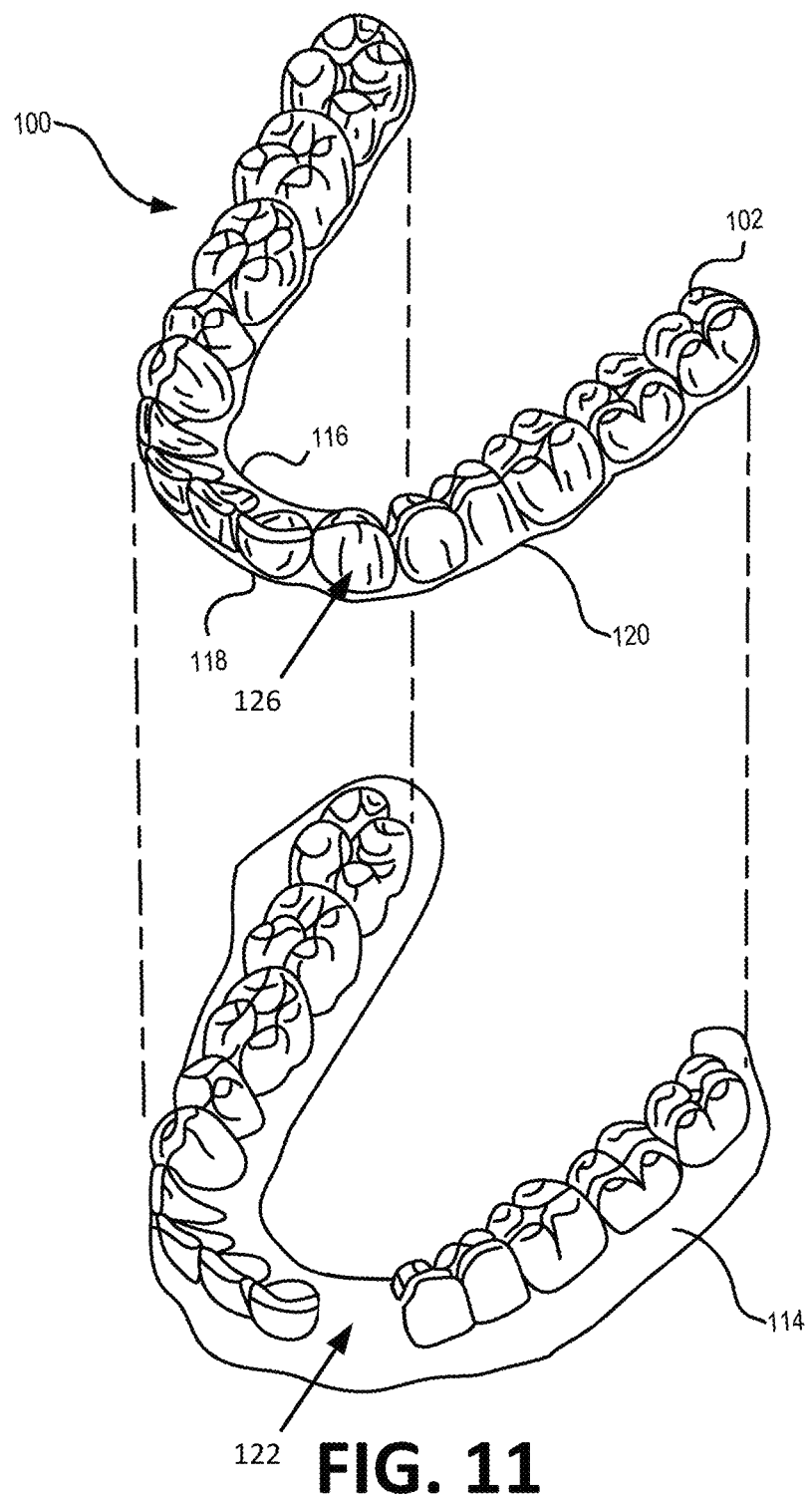
FIG. 11 is a diagram showing an example of an orthodontic aligner that includes a space buffer or cavity in the form of a "most average" tooth shape designed to fit over un-erupted teeth.

FIG. 11 shows an orthodontic aligner 100, which includes a cavity 126 in the form of a "most average" tooth shape as determined by either the EFD or spherical harmonics methods described above. The cavity 126 is designed to provide an adequate yet sufficient space for each specific un-erupted tooth while improving aesthetics and comfort for the patient during orthodontic aligner wear.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:
1. A computer-implemented method for forming an orthodontic appliance, the method comprising:
associating an at least partially un-erupted tooth of a patient's teeth with a representative 3D descriptor in 3D descriptor space, the 3D descriptor space including a plurality of 3D descriptors parametrically representing virtual surface contours corresponding to a tooth type, each of the plurality of 3D descriptors being associated with one of a plurality of 3D virtual representations of a plurality of teeth of a plurality of subjects, the representative 3D descriptor having a minimum distance to other 3D descriptors in the 3D descriptor space;

forming a virtual tooth shape for the at least partially un-erupted tooth using the representative 3D descriptor; and providing instructions to form at least a portion of the orthodontic appliance for the at least partially un-erupted tooth using the virtual tooth shape.

2. The computer-implemented method of claim 1, wherein the plurality of 3D descriptors comprise a convex bounding 3D shape.

3. The computer-implemented method of claim 1, wherein the plurality of 3D descriptors are represented using an Elliptic Fourier Descriptor (EFD) of the virtual surface contours.

4. The computer-implemented method of claim 1, wherein the virtual surface contours are according to locational coordinates identified along orthogonal systems.

5. The computer-implemented method of claim 4, wherein the location coordinates are polar coordinates that virtually represent a plurality of voxelized spheres.

6. The computer-implemented method of claim 1, wherein the plurality of 3D descriptors comprises a plurality of spheres.

7. The computer-implemented method of claim 6, wherein the plurality of spheres comprise a plurality of voxelized spheres.

8. The computer-implemented method of claim 1, wherein the orthodontic appliance comprises a removable polymeric appliance.

9. The computer-implemented method of claim 1, wherein providing instructions to form at least the portion of the orthodontic appliance comprises providing instructions to three-dimensionally print the at least the portion of the orthodontic appliance.

10. The computer-implemented method of claim 1, wherein the representative 3D descriptor comprises an average 3D descriptor of the plurality of 3D descriptors.

11. The computer-implemented method of claim 1, further comprising identifying the plurality of 3D descriptors to parametrically represent the virtual surface contours according to a plurality of spatial parameters.

12. The computer-implemented method of claim 11, wherein identifying the plurality of 3D descriptors comprises creating at least one spherical harmonic-based signature based on a sum of spherical harmonics for the plurality of 3D descriptors.

13. The computer-implemented method of claim 12, wherein the at least one spherical harmonic-based signature comprises a plurality of spherical harmonic-based signatures.

14. The computer-implemented method of claim 13, further comprising finding the minimum distance by identifying a minimum distance between two or more of the plurality of spherical harmonic-based signatures in the 3D descriptor space.

15. The computer-implemented method of claim 14, wherein identifying the minimum distance comprises performing a least squares analysis of a Euclidean distance between the two or more of the plurality of spherical harmonic-based signatures.

16. A system, comprising:
one or more processors;
memory coupled to the one or more processors, the memory configured to store computer-program instructions, that, when executed by the one or more processors, perform a computer-implemented method comprising:

associating an at least partially un-erupted tooth of a patient's teeth with a representative 3D descriptor in 3D descriptor space, the 3D descriptor space including a plurality of 3D descriptors parametrically representing virtual surface contours corresponding to a tooth type, each of the plurality of 3D descriptors being associated with one of a plurality of 3D virtual representations of a plurality of teeth of a plurality of subjects, the representative 3D descriptor having a minimum distance to other 3D descriptors in the 3D descriptor space;

forming a virtual tooth shape for the at least partially un-erupted tooth using the representative 3D descriptor; and providing instructions to form at least a portion of an orthodontic appliance for the at least partially un-erupted tooth using the virtual tooth shape.

17. The system of claim 16, wherein the computer-implemented method further comprises identifying the plurality of 3D descriptors to parametrically represent the virtual surface contours according to a plurality of spatial parameters.

18. The system of claim 17, wherein identifying the plurality of 3D descriptors comprises creating at least one spherical harmonic-based signature based on a sum of spherical harmonics for the plurality of 3D descriptors.

19. The system of claim 18, wherein the at least one spherical harmonic-based signature comprises a plurality of spherical harmonic-based signatures.

20. The system of claim 19, wherein the computer-implemented method further comprises finding the minimum distance by identifying a minimum distance between two or more of the plurality of spherical harmonic-based signatures in the 3D descriptor space.

* * * * *